United States Patent
Van Wechel et al.

(10) Patent No.: US 7,197,095 B1
(45) Date of Patent: Mar. 27, 2007

(54) INVERSE FAST FOURIER TRANSFORM (IFFT) WITH OVERLAP AND ADD

(75) Inventors: Robert J. Van Wechel, Yorba Linda, CA (US); Ivan L. Johnston, Corona, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 0 days.

(21) Appl. No.: 11/000,861

(22) Filed: Dec. 1, 2004

Related U.S. Application Data

(62) Division of application No. 10/256,060, filed on Sep. 26, 2002, now Pat. No. 6,952,460.

(60) Provisional application No. 60/325,373, filed on Sep. 26, 2001.

(51) Int. Cl.
 *H04B 1/10* (2006.01)
(52) U.S. Cl. .................. 375/350; 708/403; 708/404; 708/405; 708/406; 708/408; 708/409
(58) Field of Classification Search ........ 709/403–409; 375/346–350; 706/24
 See application file for complete search history.

(56) References Cited

U.S. PATENT DOCUMENTS

| | | | |
|---|---|---|---|
| 4,186,349 A | | 1/1980 | Gordy et al. |
| 4,471,357 A | * | 9/1984 | Wu et al. .................. 342/25 D |
| 4,559,605 A | * | 12/1985 | Norsworthy ................. 708/403 |
| 4,689,762 A | * | 8/1987 | Thibodeau, Jr. ............. 708/409 |
| 4,940,977 A | * | 7/1990 | Mandell ...................... 341/143 |
| 5,293,330 A | * | 3/1994 | Sayegh ........................ 708/406 |
| 5,299,144 A | | 3/1994 | Bartkowiak et al. |
| 5,610,991 A | | 3/1997 | Janse |
| 5,825,327 A | * | 10/1998 | Krasner .................. 342/357.09 |
| 6,098,088 A | * | 8/2000 | He et al. ...................... 708/406 |
| 6,161,130 A | | 12/2000 | Horvitz et al. |
| 6,167,417 A | | 12/2000 | Parra et al. |
| 6,292,592 B1 | | 9/2001 | Braunreiter et al. |
| 6,404,806 B1 | | 6/2002 | Ginesi et al. |
| 6,480,139 B1 | | 11/2002 | Hoctor |

(Continued)

OTHER PUBLICATIONS

"Interim Guidelines for Examination of Patent Applications for Patent Subject Matter Eligibility".*

(Continued)

*Primary Examiner*—Jay K. Patel
(74) *Attorney, Agent, or Firm*—Knobbe Martens Olson & Bear LLP

(57) ABSTRACT

A system for efficiently filtering interfering signals in a front end of a GPS receiver is disclosed. Such interfering signals can emanate from friendly, as well as unfriendly, sources. One embodiment includes a GPS receiver with a space-time adaptive processing (STAP) filter. At least a portion of the interfering signals are removed by applying weights to the inputs. One embodiment adaptively calculates and applies the weights by Fourier Transform convolution and Fourier Transform correlation. The Fourier Transform can be computed via a Fast Fourier Transform (FFT). This approach advantageously reduces computational complexity to practical levels. Another embodiment utilizes redundancy in the covariance matrix to further reduce computational complexity. In another embodiment, an improved FFT and an improved Inverse FFT further reduce computational complexity and improve speed. Advantageously, embodiments can efficiently null a relatively large number of jammers at a relatively low cost and with relatively low operating power.

4 Claims, 12 Drawing Sheets

U.S. PATENT DOCUMENTS

| | | | |
|---|---|---|---|
| 6,587,501 | B2 | 7/2003 | Yu |
| 6,650,714 | B2 | 11/2003 | Dogan et al. |
| 6,735,427 | B2 * | 5/2004 | Higbie .................... 455/278.1 |
| 6,745,352 | B2 | 6/2004 | Cheng |
| 6,778,591 | B2 | 8/2004 | Sato |
| 6,801,589 | B1 | 10/2004 | Dogan |
| 6,885,338 | B2 | 4/2005 | Gaus et al. |
| 6,898,612 | B1 * | 5/2005 | Parra et al. ................. 708/405 |
| 2002/0168035 | A1 * | 11/2002 | Carlson et al. ............. 375/343 |

OTHER PUBLICATIONS

Nicholson, et al., "Computer Simulation of Digital Beam Forming Adaptive Antennas for GPS Interference Mitigation" [online] Presented at ION Navigation 2000 Conference; Long Beach, CA, Jan. 21-23, 1998, Retrieved from the Internet:<URL:http://www.mayflowercom.com/computersim.htm>. Retrieved on Sep. 19, 2002.

Upton, et al., "Commercial-Off-The-Shelf (COTS) GPS Interference Canceller and Test Results" [online] Presented at ION Navigation 2000 Conference; Long Beach, CA, Jan. 21-23, 1998, Retrieved from the Internet: <URL:http://www/mayflowercom.com/cots.htm>. Retrieved on Sep. 19, 2002.

Nicolaides, et al., "Digital Beam/Null Forming Adaptive Antenna for GPS Anti-Jam Application" [online] Paper to be presented at the 23rd Joint Services Data Exchange Meeting, Orlando, FL, Nov. 18-21, 1996 <URL:http://www.mayflowercom.com/digitalbeam.htm>. Retrieved on Sep. 19, 2002.

Lawrence R. Rabiner and Bernard Gold, "Theory and Application of Digital Signal Processing" Prentice-Hall, 1975 ISBN 0-13-914101-4, pp. 604-609.

* cited by examiner

| ELEMENT | 1 | 2 | 3 |
|---|---|---|---|
| 1 | 1x1 | 1x2 | 1x3 |
| 2 |  | 2x2 | 2x3 |
| 3 |  |  | 3x3 |

*FIG. 2A*

| ELEMENT | 1 | 2 | 3 | 4 | 5 | 6 | 7 |
|---|---|---|---|---|---|---|---|
| 1 | 1x1 | 1x2 | 1x3 | 1x4 | 1x5 | 1x6 | 1x7 |
| 2 |  | 2x2 | 2x3 | 2x4 | 2x5 | 2x6 | 2x7 |
| 3 |  |  | 3x3 | 3x4 | 3x5 | 3x6 | 3x7 |
| 4 |  |  |  | 4x4 | 4x5 | 4x6 | 4x7 |
| 5 |  |  |  |  | 5x5 | 5x6 | 5x7 |
| 6 |  |  |  |  |  | 6x6 | 6x7 |
| 7 |  |  |  |  |  |  | 7x7 |

Five Taps of Element #1 Correlated With Itself

| | Tap #1 | | Tap #2 | | Tap #3 | | Tap #4 | | Tap #5 | |
|---|---|---|---|---|---|---|---|---|---|---|
| | Real | Imag | Real | Imag | Real | Imag | Real | Imag | Real | Imag |
| | 5244.13 | 0 | 1801.855 | −1.8095 | −1114.86 | 80.6266 | 256.3946 | −76.091 | 237.261 | −150.31 |
| | 1801.855 | 1.8095 | 5233.4 | 0 | 1796.717 | −2.3642 | −1116.81 | 81.2396 | 257.4601 | −77.5363 |
| | −1114.86 | −80.6266 | 1796.717 | 2.3642 | 5230.91 | 0 | 1795.81 | −1.9694 | −1116.38 | 80.4925 |
| | 256.3946 | 76.091 | −1116.81 | −81.2396 | 1795.81 | 1.9694 | 5230.52 | 0 | 1796.098 | −2.1725 |
| | 237.2613 | 150.3137 | 257.4601 | 77.5363 | −1116.38 | −80.4925 | 1796.088 | 2.1725 | 5230.22 | 0 |

Five Taps of Element #1 Correlated With Five Taps of Element #2

| | Tap #1 | | Tap #2 | | Tap #3 | | Tap #4 | | Tap #5 | |
|---|---|---|---|---|---|---|---|---|---|---|
| | Real | Imag | Real | Imag | Real | Imag | Real | Imag | Real | Imag |
| | −1120.9 | −1362.6 | −502.656 | −320.386 | 163.6748 | 346.6274 | −149.365 | −131.021 | −239.37 | −115.52 |
| | −356.243 | −506.466 | −1117.1 | −1360.1 | −500.989 | −319.004 | 164.5007 | 346.8862 | −150.072 | −130.762 |
| | 211.2112 | 332.14 | −356.772 | −503.39 | −1117.5 | −1358.7 | −500.91 | −318.412 | 164.1389 | 346.4896 |
| | 12.9539 | −120.452 | 211.6554 | 330.7709 | −356.488 | −504.023 | −1117.5 | −1359 | −500.77 | −318.217 |
| | 8.2171 | −128.568 | 13.0397 | −122.502 | 211.8024 | 329.794 | −356.59 | −504.402 | −1117.3 | −1358.7 |

INVERSE FAST FOURIER TRANSFORM (IFFT) WITH OVERLAP AND ADD

RELATED APPLICATIONS

This application is a divisional application of U.S. application Ser. No. 10/256,060, filed Sep. 26, 2002 now U.S. Pat. No. 6,952,460, which claims the benefit under 35 U.S.C. § 119(e) of U.S. Provisional Application No. 60/325,373, filed Sep. 26, 2001, the entireties of which are hereby incorporated by reference herein.

This application is also related to copending application titled AN EFFICIENT SPACE-TIME ADAPTIVE PROCESSING (STAP) FILTER FOR GLOBAL POSITIONING SYSTEM (GPS) RECEIVERS, Ser. No. 11/000,827 and to copending application titled AN EFFICIENT SPACE-TIME ADAPTIVE PROCESSING (STAP) FILTER FOR GLOBAL POSITIONING SYSTEM (GPS) RECEIVERS, Ser. No. 11/000,718, both filed on the same date as the present application, the entireties of which are hereby incorporated by reference.

BACKGROUND OF THE INVENTION

1. Field of the Invention

The invention is generally related to GPS receivers, and in particular, to acquisition and tracking of a pseudorandom noise (PN) signal in a Global Positioning System (GPS) receiver in a relatively noisy environment.

2. Description of the Related Art

The Global Positioning System (GPS) Operational Constellation nominally comprises 24 earth-orbiting satellites. Each satellite radiates a spread spectrum, pseudorandom noise (PN) signal indicating the satellite's position and time. A GPS receiver tuned to receive the signals from the satellites can compute the distance to the satellites and calculate the receiver's position, velocity, and time. The receiver calculates the distance to a satellite by multiplying the propagation rate of the satellite's radio signal, i.e., the speed of light, by the time it took the signal to travel from the satellite to the receiver.

Each satellite transmits two carrier signals referred to as L1 and L2. L1 operates at a frequency of 1.57542 GHz and L2 operates at a frequency of 1.22760 GHz. Multiple binary codes induce phase modulation upon the L1 and L2 carrier signals. Each satellite in the GPS Operational Constellation transmits a unique code over the L1 and L2 carrier signals. One of the phase-modulated signals is C/A Code (Coarse Acquisition Code). Presently, 32 codes are defined for the C/A Code. A satellite's C/A Code phase modulates the L1 carrier over a 1.023 MHz bandwidth. The C/A Code is a repeating 1023 bit sequence. At 1023 bits and 1.023 MHz, the C/A Code repeats every millisecond. The C/A Code forms the basis for the Standard Positioning Service (SPS) used by civilians.

Another phase-modulated signal is the P-Code (Precise Code). The P-Code is similar to the C/A Code in that it is a PN sequence which phase modulates a carrier signal. The P-Code modulates both the L1 and the L2 signals at a rate of 10.23 MHz. In an Anti-Spoofing mode, the P-Code is encrypted to produce the Y-Code to restrict access to users with the encryption key. The P-Code forms the basis for the military's Precise Positioning Service (PPS). It will be understood that additional signals, such as M-Code, can be added to existing carriers or to additional carriers.

A GPS receiver preferably functions in a variety of environments. Both friendly and unfriendly environments can include interference. For example, jammers from "unfriendly" sources can intentionally cause interference. Interference can also originate from "friendly" sources, such as radar transmitters and commercial television transmitters. For example, non-linearities in RF power amplifiers can create out-of-band RF signals, which in turn cause RF interference to GPS receivers. In the presence of interference, a GPS receiver can fail to acquire a GPS signal quickly, if at all. This can lead to undesirable errors in navigation, guidance, tracking, etc.

One technique that has been used in radar receivers to filter out interfering signals is space-time adaptive processing (STAP). Disadvantageously, conventional STAP techniques are computationally very complex and typically require the use of a very powerful computer to compute in real time.

SUMMARY OF THE INVENTION

A system for efficiently filtering interfering signals in a front end of a GPS receiver is disclosed. Such interfering signals can emanate from friendly, as well as unfriendly, sources. One embodiment includes a GPS receiver with a space-time adaptive processing (STAP) filter. At least a portion of the interfering signals are removed by applying weights to the inputs. One embodiment adaptively calculates and applies the weights by Fourier Transform convolution and Fourier Transform correlation. In one embodiment, the Fourier Transform is computed via a Fast Fourier Transform (FFT). This approach advantageously reduces computational complexity to practical levels. Another embodiment utilizes redundancy in the covariance matrix to further reduce computational complexity. In another embodiment, an improved FFT and an improved Inverse FFT further reduce computational complexity and improve speed. Advantageously, embodiments can efficiently null a relatively large number of jammers at a relatively low cost and with relatively low operating power.

One embodiment includes a method of filtering interference in a GPS receiver, where the method includes: receiving digital input samples from a plurality of antenna elements; computing Fourier Transforms of the digital input samples, wherein the Fourier Transforms of input samples of one antenna element are identifiably maintained from Fourier Transforms of input samples of another antenna element; using Fourier Transform correlation to compute a cross-power spectra for the antenna elements; computing an Inverse Fourier Transform of the cross-power spectra; calculating a covariance matrix from the Inverse Fourier Transform of the cross-power spectra; inverting the covariance matrix; multiplying the inverted covariance matrix with a steering vector to generate weights; and applying the weights to the digital input samples to filter the interference.

Another embodiment includes a GPS receiver adapted to filter interference, where the GPS receiver includes: a plurality of input circuits configured to receive digital input samples from a plurality of antenna elements; a plurality of first signal processors configured to compute Fourier Transforms of the digital input samples, wherein the Fourier Transforms of input samples of one antenna element are identifiably maintained from the Fourier Transforms of input samples of another antenna element; a second signal processor configured to compute a cross-power spectra for the antenna elements from the Fourier Transforms; a third signal processor configured to compute an Inverse Fourier Transform of the cross-power spectra; a fourth signal processor is configured to calculate a covariance matrix from the Inverse Fourier Transform of the cross-power spectra; a fifth signal processor configured to invert the covariance matrix to an inverted covariance matrix; a sixth signal processor configured to multiply the inverted covariance matrix with a steering vector to generate weights; and a seventh signal processor configured to applying the weights to the digital input samples to filter the interference.

One embodiment includes a method of calculating a sub-matrix of a covariance matrix for a GPS space-time adaptive processing (STAP) filter, where the method includes: calculating at least one row of the sub-matrix; and copying at least one value from the calculated row, where the copied value is loaded to a position in the sub-matrix that is displaced in time from the calculated value.

One embodiment includes a signal processor adapted to calculate a sub-matrix of a covariance matrix for a GPS space-time adaptive processing (STAP) filter, where the signal processor includes: means for calculating at least one row of the sub-matrix of the covariance matrix for the GPS STAP filter; and means for copying at least one value from the calculated row, where the copied value is loaded to a position in the sub-matrix that is displaced in time from the calculated values.

One embodiment includes a method of reusing data in a GPS space-time adaptive processing (STAP) filter, where the method includes: calculating a Fourier Transform of input samples for an antenna element; using the calculated Fourier Transform to compute Fourier Transform correlation; and using the same calculated Fourier Transform to compute Fourier Transform convolution to reuse the data.

One embodiment includes a GPS space-time adaptive processing (STAP) filter, where the STAP filter includes: a plurality of Fourier Transform processors configured to transform input samples from time domain to frequency domain; a plurality of Fourier Transform correlation circuits coupled to the Fourier Transform processors, where a Fourier Transform correlation circuit is configured to combine input samples with weights in frequency domain such that a presence of an undesired signal in the input samples is reduced; and a plurality of Fourier Transform convolution circuits coupled to the Fourier Transform processors, where a Fourier Transform convolution is configured to at least compute cross-power spectra between multiple antenna elements.

One embodiment includes a method of inverting a covariance matrix in a GPS space-time adaptive processing (STAP) filter, where the method includes: performing triangular factorization on the covariance matrix; and performing substitution to invert the covariance matrix.

One embodiment includes a method of integrating correlation data in a GPS space-time adaptive processing (STAP) filter, where the method includes: receiving a plurality of cross-power spectra computations, where the cross-power spectra computations are related to an antenna element in a multiple-element antenna array; and integrating the plurality of cross-power spectra computations with lossy integration.

One embodiment includes a signal processor in a GPS space-time adaptive processing (STAP) filter, where the signal processor includes: a multiplier in a Fourier Transform correlation circuit, where the multiplier computes at least a cross-power spectra of one antenna array and another; and a memory coupled to the multiplier, where the memory is configured to calculate lossy integration of values from the multiplier.

One embodiment includes a method of computing a Fast Fourier Transform (FFT), where the method includes: receiving input samples in natural order; providing the input samples directly to an FFT pipeline without a delay stage that implements filling of a constant, wherein the direct loading to the FFT pipeline includes the constant loading; and processing the input samples through the FFT pipeline.

One embodiment includes an input stage for a pipelined circuit that computes a Fourier Transform, where the input stage includes: a multiplier configured to multiply input samples with twiddle factors; a first delay stage coupled to an output of the multiplier; a switch coupled to an input of the multiplier and to an output of the first delay stage, where the switch is configured to provide a straight connection in a first state and a cross connection in a second state; a second delay stage coupled to an output of the switch; and a butterfly stage coupled to the switch and to the second delay stage, where the butterfly stage is configured to couple to another stage of the pipelined circuit for processing of the Fourier Transform.

One embodiment includes a method of computing an Inverse Fast Fourier Transform (IFFT) with Lap and Add, where the method includes: receiving values from frequency bins in reverse binary order; computing at least part of the IFFT in a radix-2 pipeline from the received values; delaying a difference output of an output butterfly to generate a delayed difference output; and summing a sum output of the output butterfly with the delayed difference output to provide a natural order output IFFT with Lap and Add output.

One embodiment includes a pipelined circuit for computing an Inverse Fourier Transform, where the pipelined circuit includes: a plurality of butterfly stages, where the butterfly stages are configured to compute sum and differences of their inputs, wherein a first butterfly stage is configured to receive an input in reverse binary order; a plurality of multipliers coupled to difference outputs of the butterfly stages, where the multipliers are configured to multiply the difference outputs with twiddle factors; a plurality of first delays circuits coupled to the multipliers; a plurality of switches coupled to the sum outputs of the butterfly stages and to the delays, where the switches are configured to switch between straight and cross connections; a plurality of second delays circuits coupled to outputs of the switches; wherein a second delay circuit is matched in delay to a corresponding first delay circuit; a third delay circuit coupled to a difference output of a last of the butterfly stages, wherein the third delay circuit is configured to have twice the delay of the second delay circuit that is coupled to the last of the butterfly stages; and a summing circuit coupled to a sum output of the last of the butterfly stages and to an output of the third delay circuit such that the summing circuit laps and adds the sum output of the last of the butterfly stages with the output third delay circuit, where an output of the summing circuit is an Inverse Fourier Transform in natural order of the inputs.

One embodiment includes a method of enhancing tracking in a carrier phase locked loop of a GPS receiver, where the method includes: calculating an approximate phase shift induced by application of the weights that are adaptively applied to an input baseband signal by a space-time adaptive processing (STAP) filter; and steering the carrier phase locked loop with the calculated phase shift to assist the carrier phase locked loop to maintain phase lock with the phase shifted baseband signal.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 2A illustrates 6 unique sub-matrices in a STAP covariance matrix for a 3-element array.

FIG. 2B illustrates 28 unique sub-matrices in a STAP covariance matrix for a 7-element array.

FIG. 3 illustrates mapping into a covariance matrix.

FIG. 5 illustrates sample data in a covariance matrix.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Space-time adaptive processing (STAP) is a powerful two-dimensional filtering technique that adaptively calculates a weight vector in response to received signals. Disadvantageously, the weight vector is difficult to compute using conventional techniques. Embodiments advantageously compute the weight vector with efficiency, thereby permitting STAP filtering techniques to be applied in a GPS receiver.

Figure 1A:
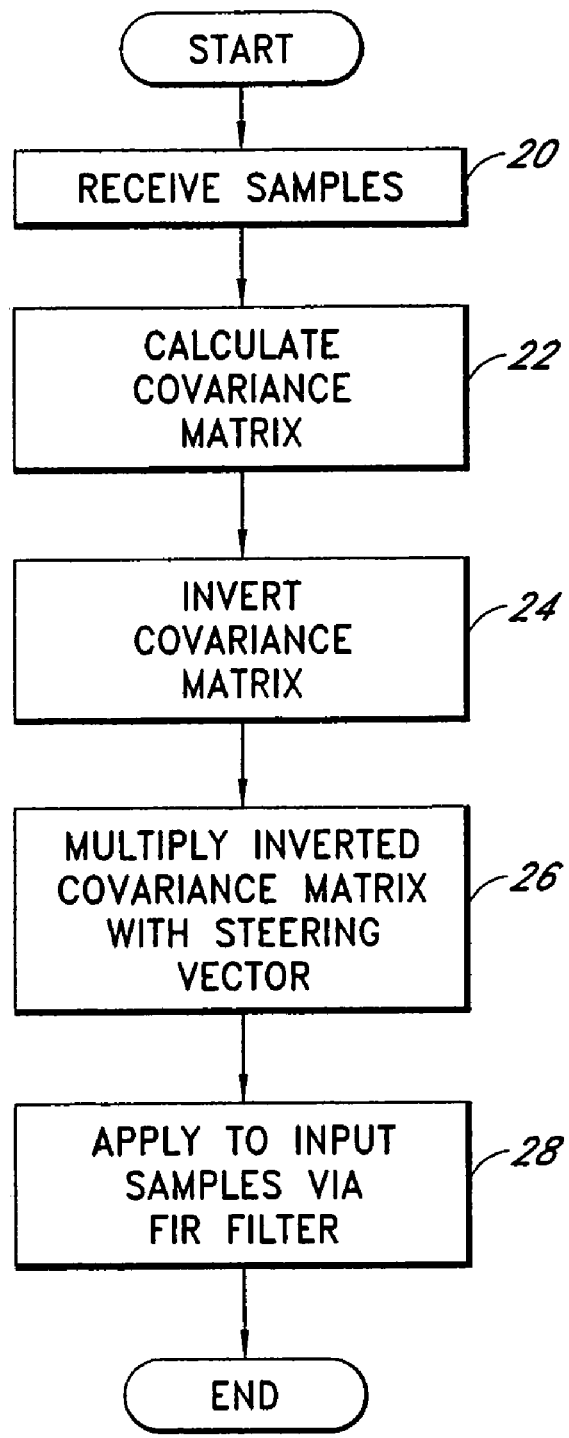
FIG. 1A generally illustrates conventional space-time adaptive processing.

FIG. 1A generally illustrates conventional space-time adaptive processing. In a first step 20, the input samples are received. A covariance matrix is calculated in a second step 22. The calculation of a covariance matrix by conventional techniques is computationally complex. In a third step 24, the covariance matrix is inverted by a matrix inversion technique. In a fourth step 26, the inverted covariance matrix is multiplied by a steering vector to generate weights. In a fifth step 28, the weights are applied to the input samples via a finite impulse response (FIR) filter.

Figure 1B:
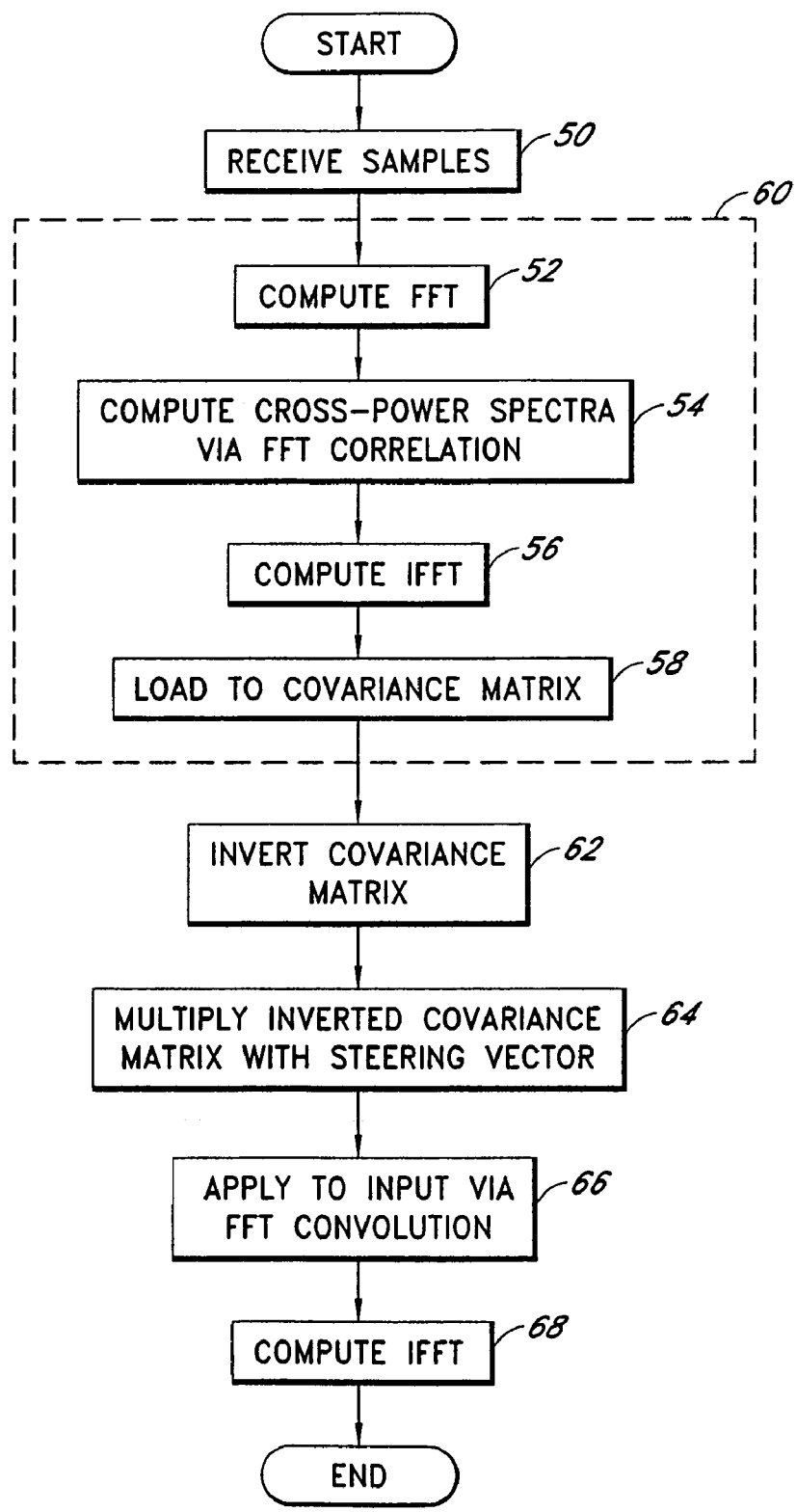
FIG. 1B generally illustrates space-time adaptive processing (STAP) according to one embodiment.

FIG. 1B generally illustrates space-time adaptive processing (STAP) according to one embodiment. It will be understood that the process can be configured to run continuously, such that the recited steps can be in operation continuously, and the steps can be operated in parallel with each other. The process will now be generally described with respect to data flow within the process. In a first step 50, the input samples from one or more antennas of a GPS system are received. The number of antennas n (or antenna elements) accessed by the STAP filtering can be related to the number of broadband interference sources that can be nulled by the STAP filtering. Typically, the number of broadband jammers that can be nulled by STAP filtering corresponds to n−1. The number of narrow-band interference sources that can be nulled is typically related to the number of frequency bins calculated with Fourier Transforms. The process advances to a second step 52.

In the second step 52, Fast Fourier Transforms (FFTs) of the input signals are computed. Although the GPS STAP filter techniques are described generally in the context of Fast Fourier Transforms (FFTs), it will be apparent to one of ordinary skill in the art that other techniques, such as Discrete Fourier Transform (DFT) and Inverse Discrete Fourier Transform (IDFT) techniques are also applicable. In addition, it will be understood by one of ordinary skill in the art that there are many different variations of Fourier Transform computation techniques that are called "Fast Fourier Transforms."

Where more than one antenna element is provided in a system, the input samples from each antenna element will typically be individually transformed via an FFT. It will be understood that the DFT can be computed instead of the FFT, but that the DFT can be more complex to calculate, particularly when the number of frequency bin calculations is relatively large. In addition, it will be understood that the GPS STAP filter techniques described herein are applicable to GPS signals, which may be received for relatively long periods of time. To transform a relatively long input sequence, the input sequence can be broken up into relatively small pieces, which are individually transformed and then later combined. These techniques will be described in greater detail later in connection with FIG. 8. The process advances from the second step 52 to a third step 54.

In the third step 54, the process computes the cross-power spectra, preferably for each antenna, via FFT correlation techniques. Computation of the cross-power spectra is described in greater detail later in connection with FIG. 1D. The process advances from the third step 54 to a fourth step 56. In the fourth step 56, inverse FFTs (IFFTs) for the cross-power spectra are computed, and the process advances to a fifth step 58. In the fifth step 58, the results of the IFFTs are loaded into a matrix to form the covariance matrix. Advantageously, the steps within a dashed box 60 calculate a covariance matrix with relatively less computing power than is typically needed for the same results using conventional techniques. The process advances from the fifth step 58 to a sixth step 62.

In the sixth step 62, the process inverts the covariance matrix. A variety of matrix inversion techniques can be used to invert the covariance matrix. The process advances from the sixth step 62 to a seventh step 64. In the seventh step 64, the process multiplies the inverted covariance matrix with a steering vector. This generates the weights that will be applied to the input samples. The weights can adjust the amplitude and the phase of the input samples. In one embodiment, the weights are repeatedly updated such that the process adapts to changing interference conditions. The weights generated from the inverted covariance matrix, as multiplied by the steering vector, serve to reduce the power received. In one typical environment, the signal from a jammer can be 40–50 dB above the noise. The GPS signal is largely unaffected by the weights, as a GPS signal is typically about 30 dB below the noise and undetected by the STAP filtering.

A variety of techniques can be used to apply the weights, including the FIR filter techniques described earlier in connection with FIG. 1A. In one embodiment, the process uses computationally efficient FFT convolution techniques to apply the weights, as described in an eighth step 66 and a ninth step 68. In another embodiment, the process uses FIR filtering techniques to apply the weights to the input samples.

In the eighth step 66, the process computes an FFT of the weights, and the process applies the weights to the input samples with FFT convolution. The process advances from the eighth step 66 to the ninth step 68. In the ninth step 68, the process computes an IFFT of the FFT convolution, thereby generating a filtered baseband signal that is provided as an input to further baseband processing circuits, such as quadrature demodulation circuits, acquisition circuits, and the like. Such STAP techniques can efficiently filter interfering signal in a GPS receiver.

Figure 1C:
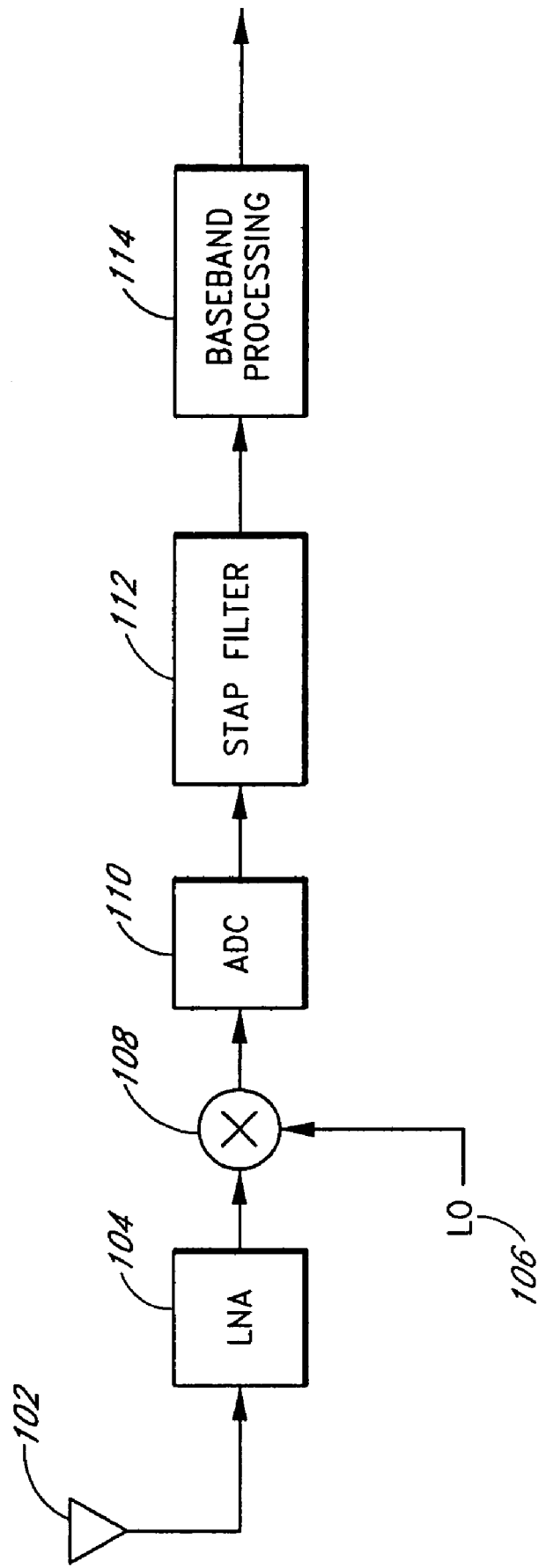
FIG. 1C illustrates a block diagram of a front end of a GPS receiver with a space-time adaptive processing (STAP) filter.

In a GPS receiver, the GPS signals from the satellites are typically received by one or more antenna and amplified by low-noise amplifiers. The received signals are then typically downconverted to baseband with a quadrature demodulator. The baseband in-phase (I) and quadrature-phase (Q) signals are then converted to digital by analog-to-digital converters, and are provided to acquisition circuits, which "acquire" a particular satellite by matching a code received by the GPS receiver to a code defined for the satellite. FIG. 1C is a system diagram that illustrates where space-time adaptive processing can advantageously be located in the data flow of a front-end portion of a GPS receiver. For clarity, FIG. 1C does not include small details, such as low-pass filters. The illustrated portion of the GPS receiver includes an antenna 102, a low noise amplifier (LNA) 104, a mixer 108, an analog-to-digital converter 110, a space-time adaptive processing (STAP) filter 112, and further baseband processing 114.

In the illustrated portion of the GPS receiver, the RF GPS signal is received by the antenna 102. It will be understood that the antenna 102 can include an array of antennas. The antenna 102 is coupled to the LNA 104. Where more than one antenna is used, each can be coupled to an individual low noise amplifier. The output of the LNA 104 is mixed with a local oscillator signal 106 by the mixer 108 to provide an analog baseband signal. It will be understood by one of ordinary skill in the art that the output of the mixer is filtered by a low-pass filter. In addition, it will be understood that the analog baseband signal can correspond to an intermediate frequency, and can be further downconverted by another process, such as a quadrature demodulation process in the digital domain.

The output of the mixer 108 is provided as an input to the analog-to-digital converter 110, which generates a digital baseband signal. In one embodiment adapted to P(Y) Code, the analog-to-digital converter is configured to sample the output of the mixer 108 at a 23.516 MHz rate. The digital baseband signal is provided as an input to the STAP filter 112. It will be understood that where there is more than the antenna 102, the LNA 104, and the mixer 108 correspond to multiple antennas, low noise amplifiers, and mixers, the analog-to-digital converter 110 will also correspond to multiple analog-to-digital converters. The STAP filter 112 advantageously at least partially compensates for interference from one or more interfering signals. One embodiment of the STAP filter 112 is described in greater detail later in connection with FIGS. 1D to 8.

The output of the STAP filter 112 is provided as an input to the baseband processing 114, which can further include quadrature demodulation circuits, acquisition circuits, carrier tracking loops, etc. In one embodiment, the acquisition circuits correspond to a fast acquisition front-end. One example of such a fast acquisition front-end is described in U.S. Pat. No. 6,452,961 to Van Wechel, entitled MASSIVELY PARALLELED SEQUENTIAL TEST ALGORITHM, the entirety of which is hereby incorporated by reference herein. The signal can then be further processed downstream by circuits that track the carrier phase for the satellite, etc.

Disadvantageously, conventional techniques to calculate the weight vector used in the STAP filter 112 are very computationally complex. The complexity of the computations increases dramatically with the number of antennas or the number of antenna elements in a multiple-element array. To calculate the weight vectors, the input signal is sampled, and a covariance matrix is computed by cross-correlating multiple taps of FIR filters for all the elements of an array of antennas. The covariance matrix is then inverted and multiplied by a steering vector to produce the set of weight vectors. The weight vectors are applied to the input signal via a Finite Impulse Response (FIR) filter. The process is continually repeated to adaptively recompute new weights for the input signal that will eliminate or at least reduce interference. However, even the calculation of the covariance matrix alone is a formidable computing task. These conventional STAP filtering techniques require relatively powerful processing power, such as the processing power available in a supercomputer. The required processing power for STAP filtering is not typically available in a GPS receiver. When conventional STAP filtering techniques are approximated or simplified to reduce the computational complexity such that the resulting sub-optimal STAP filtering can be implemented with available processing power, the filtering of the interference is far less than optimal. For example, one conventional system with FFT processing in a STAP filtering application does not exploit space-time correlation for wideband jammers.

One embodiment provides full STAP filtering that is computationally less complex than conventional STAP filtering techniques and can advantageously be implemented with relatively less powerful computing resources. In one embodiment, the STAP filtering techniques are computed in a more efficient manner than conventional STAP filtering techniques. This permits full STAP filtering techniques to be used even where powerful computing resources are not available. Although the benefits of computationally less complex STAP filtering techniques will be apparent to systems with one or with relatively few antenna or antenna elements, the computational savings become progressively more dramatic as the number of antenna or antenna elements increases. The disclosed STAP filtering techniques are sufficiently efficient to permit one embodiment to be implemented in a field programmable gate array (FPGA). However, it will be understood by one of ordinary skill in the art that the disclosed techniques can also be combined with sub-optimal STAP filtering techniques.

Figure 1D:
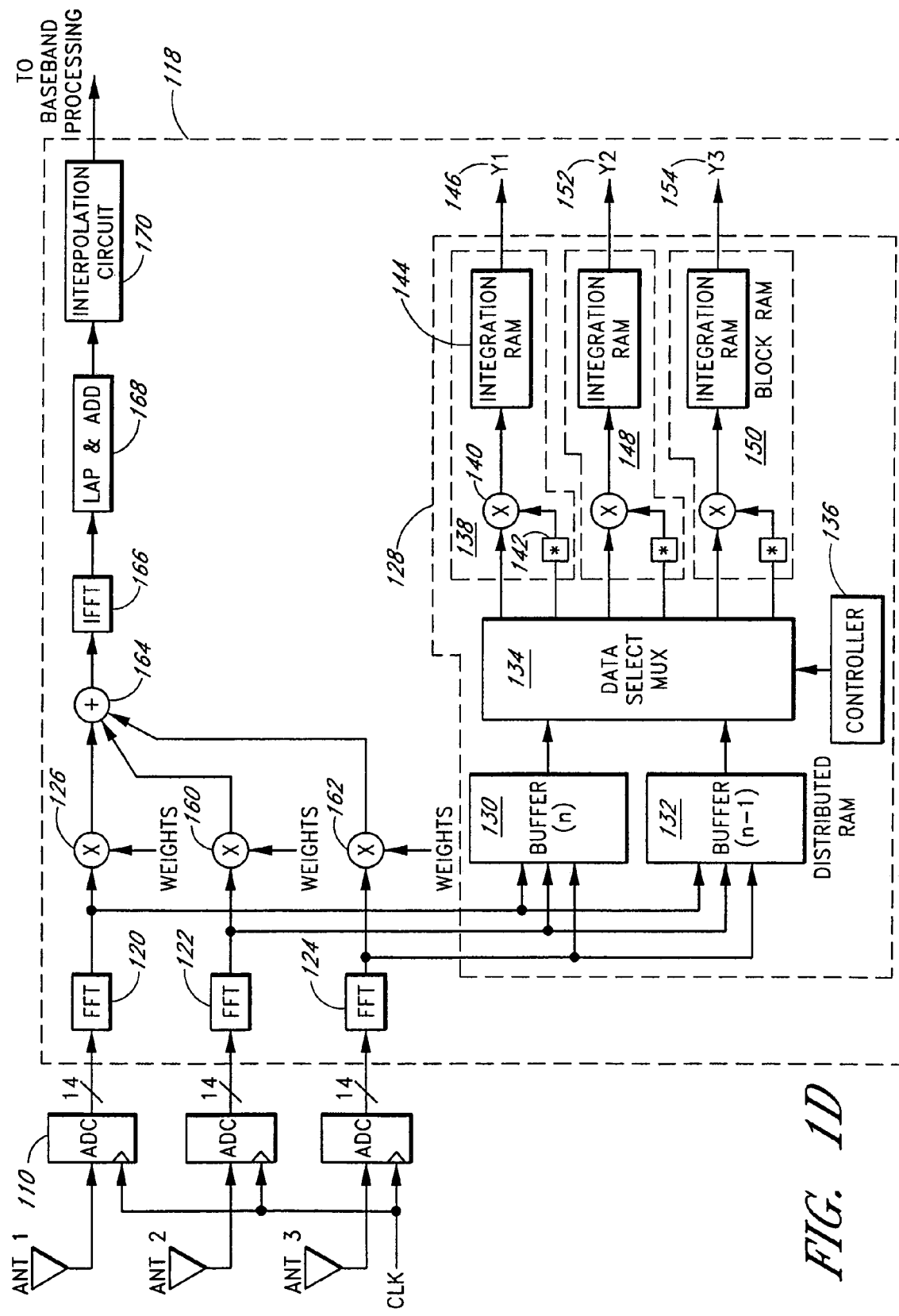
FIG. 1D illustrates a block diagram of a portion of a GPS STAP filter.

FIG. 1D illustrates a block diagram of an upstream portion of a STAP filter 118 according to one embodiment. The upstream portion of the STAP filter 118 shown in FIG. 1D efficiently supports the computation of the covariance matrix with Fast Fourier Transform (FFT) convolution and correlation techniques. In one embodiment, the illustrated upstream portion of the STAP filter 118 is implemented in hardware, such as in a field programmable gate array (FPGA), an application specific integrated circuit (ASIC), programmable logic device, and the like. Other portions of the STAP filter can be implemented in firmware or in software that is executed by a microprocessor or a digital signal processor (DSP), and the like. It will be understood that the STAP filter can be partitioned into hardware and software in a different manner than that illustrated, and it will also be understood that alternate embodiments include those that are implemented entirely in hardware or in software. While the illustrated embodiment is described in the context of an FFT, one of ordinary skill in the art will appreciate that Discrete Fourier Transform (DFT) techniques are also applicable.

The illustrated STAP filtering techniques can be used with one or more antennas. It will be understood that the number of antenna or antenna elements can vary in a broad range, and that the STAP filter configuration shown in FIG. 1D. In the illustrated embodiment of FIG. 1D, the STAP filter is shown in a configuration suitable for a 3-element antenna array. It will be understood by one of ordinary skill in the art that the STAP filter can be used for 2 to n number of antenna elements or to different polarization ports, e.g., right-hand circular polarization (RHCP) and left-hand circular polarization (LHCP), and that the description of the 3-element configuration corresponds to one example. As used herein, the term "antenna element" covers both antenna elements and polarization ports. The digital baseband signals from the analog-to-digital converters are provided as inputs to Fast Fourier Transform (FFT) processors. For example, an output of the analog-to-digital converter 110 is provided as an input to a first input FFT processor 120. For clarity, the LNA 104 and the mixer 108 from FIG. 1C are not reproduced in FIG. 1D.

The time-domain samples of the digital baseband signals are loaded into FFT memories. In one embodiment, at least half of the memory space in the FFT memories is filled with zeroes to prevent circular correlations from being computed. The first input FFT processor 120 transforms the time-domain samples of the digital baseband signal from the analog-to-digital converter 110 from time domain to frequency domain. The number of frequency bins can correspond to a very broad range. In one embodiment, the first input FFT processor 120 computes 64 frequency bins. In another embodiment, 16 points are computed. A second input FFT processor 122 and a third input FFT processor 124 transform the time-domain samples from the digital baseband signals of their respective analog-to-digital converters. It will be understood by one of ordinary skill in the art that the signal processing for the other antenna or other antenna elements can be processed in the same manner as the signal processing for the first antenna. A variety of FFT configurations can be used for the input FFT processors. One particular embodiment of an input FFT processor that can advantageously be used with the STAP filter is described in greater detail later in connection with FIG. 7.

The output of the first input FFT processor 120 is advantageously provided to both a first multiplier 126 and to an FFT Correlation circuit 128. Use of the same FFT computation for both convolution and correlation enhances efficiency. In another embodiment, a separate FFT processor is used for convolution and for correlation. The first multiplier 126 performs a portion of the FFT convolution (or weighting or adding) by multiplying the frequency-domain representation or frequency bins of the input signal by transformed weight vectors to reduce or remove interfering signals. The data flow path with the first multiplier 126 forms part of the beamforming and time-domain STAP filtering, as will be explained in greater detail later with respect to FIG. 1D and also later in FIG. 6.

The illustrated FFT Correlation circuit 128 performs FFT Correlation for 3 antenna elements. The FFT Correlation circuit 128 includes a first memory buffer 130 and a second memory buffer 132. The outputs of the input FFT processors are provided as inputs to the first memory buffer 130 and to the second memory buffer 132 of the FFT Correlation circuit 128. The FFT Correlation circuit 128 is configured such that the contents of the first memory buffer 130 and the second memory buffer 132 are staggered or delayed by one FFT computation, i.e., the contents of the second memory buffer 132 are delayed by one FFT computation from the contents of the first memory buffer 130. In one embodiment, the first memory buffer 130 and the second memory buffer 132 are implemented with distributed random access memory (RAM).

A multiplexer 134 controlled by a multiplexer controller 136 selects outputs of the first memory buffer 130 and the second memory buffer 132 such that the cross-power spectra between various antenna elements can be computed. In one embodiment, all combinations of cross-power spectra for the various element FFTs are computed. To compute the cross-power spectra between two antenna elements, an FFT from a first antenna element is multiplied with a delayed (prior computation) and conjugated FFT of a second antenna element.

For example, with respect to the first antenna, the multiplexer controller 136 selects between the first memory buffer 130 and the second memory buffer 132 to provide a first FFT correlator 138 with the data needed to compute the cross-power spectra between the first antenna and the other antennas. The data corresponding to the FFT from the first antenna for the current data, which in one embodiment corresponds to the most recent FFT computation, is retrieved from the first memory buffer 130 by the multiplexer 134 and is provided to a multiplier 140 of the first FFT correlator 138. The multiplexer controller 136 further controls the multiplexer 134 such that the data from an FFT computation for the second antenna that is prior to the current data is provided as an input to a complex conjugation circuit 142.

The complex conjugation circuit 142 takes the complex conjugate of the prior FFT computation and provides it as an input to the multiplier 140. An output of the multiplier 140 is provided as an input to an integration memory 144. The integration effectively averages multiple samples of the cross-power spectra computations and improves the signal to noise ratio of the computed cross-power spectra. A variety of integration techniques can be used, including integrate and dump techniques and lossy integration techniques.

With integrate and dump techniques, the integration memory 144 integrates the cross-power spectra over a period of time. This period of time is known as the integration period. In one embodiment, the integration period is about 2 mS. In another embodiment, the integration period is about 1 mS. The integration period can be varied in a very broad range. For example, an integration period within a range between about 0.5 mS to about 50 mS can be used. In another embodiment, the integration period is in a range between about 1 mS to about 20 mS. The lower limit for the integration period is determined by the point at which the covariance matrix remains solvable. In addition, it should be noted that the available processing power can place a practical limit on the integration period.

However, integrate and dump techniques can perform relatively poorly in the presence of "blinking jammers," which broadcast interfering signals in relatively short pulses. Integrate and dump techniques perform particularly poorly when the pulse rate of the blinking jammer matches with the integration period. Although the effects of blinking jammers can be mitigated by changing or increasing the integration period, an increase in the integration period can disadvantageously slow the response of the GPS STAP filter to interfering signals. In another embodiment, lossy integration techniques are used to mitigate against blinking jammers.

Lossy integration techniques perform well in the presence of blinking jammers. Lossy Integration differs from conventional integration. In a conventional integrator, such as an integrate and dump circuit, samples of data are accumulated over the integration period, the accumulated data is "dumped" at the end of the integration period, and the integrate and dump circuit is reset to perform another integration for the next integration period.

With lossy integration, the results of the integration are not dumped. A portion of the integration results from prior periods is maintained in the integrated sum, but gradually diminishes over time. One example of lossy integration is expressed in Equation 1, where I indicates the value of the lossy integrated sum, and x corresponds to the value that is integrated. It will be understood that the values that are integrated are complex numbers.

$$I_{new} = y \cdot I_{old} + x(1-y) \quad \text{(Eq. 1)}$$

In Equation 1, y is a fraction. In one embodiment, y is a fraction with a denominator corresponding to a multiple of 2, which eases computation by permitting divisions to be implemented with bit shifts. For example, in one embodiment, the value of y corresponds to 63/64 and the value of (1−y) is 1/64. It will be understood that the value of y can vary in a very broad range.

In one embodiment, the output of the multiplier 140 is provided in a 28-bit wide data path. The multiplexer controller 136 further selects prior FFT computations from the other antenna elements, which are multiplied by the multiplier 140 and integrated in the integration memory 144. The output Y1 146 of the integration memory 144 includes the cross-power spectra between a present FFT (channel 1 or antenna element 1) and a present FFT (channel 2 or antenna element 2), where present corresponds to the recent FFT computation as retrieved from the first memory buffer 130. In one embodiment, the integration memory 144 is a 64-bit by 1920 memory device. In one embodiment, the integration memory 144 stores 64 frequency bins for at least each of the unique combinations for the covariance matrix. It will be understood that the number of frequency bins in the integration memory 144 can vary in a very broad range, but that the number of frequency bins is typically the same as the number of frequency bins in the first input FFT processor 120. Further details of one computation of the covariance matrix are described later in connection with FIGS. 4A and 4B. In one example, a 3-element antenna array has 6 unique combinations, and the integration memory 144 stores 64×6 or 64 frequency bins by the 6 unique combinations. In another example, with a 7-element antenna array, the 7-element antenna array has 28 unique combinations, and the integration memory 144 stores 64×28 combinations. In one embodiment, further computations needed to generate a covariance method are performed in software.

A second FFT Correlator 148 and a third FFT Correlator 150 compute the cross-power spectra between a present FFT (channel 1 or antenna element 1) and prior FFT (channel 2 or antenna element 2) and between a prior FFT (channel 1 or antenna element 1) and present FFT (channel 2 or antenna element 2), where prior corresponds to the prior FFT computation as retrieved from the second memory buffer 132. The outputs of the second FFT Correlator 148 and the third FFT Correlator 150 are represented in FIG. 1D by the output Y2 152 and the output Y3 154, respectively. In one embodiment, the FFT Correlation circuit 128 is configured such that the first FFT Correlator 138, the second FFT Correlator 148, and the third FFT Correlator 150 advantageously share the first memory buffer 130, the second memory buffer 132, and the multiplexer 134.

In one embodiment, the output Y1 146 is provided in a 32-bit wide data path. In one embodiment, the output Y1 146 is read by a software process, which computes the covariance matrix from the cross-power spectra data. Further details of the covariance matrix will be described later in connection with FIGS. 3 to 5. The cross-power spectra data from the various antenna elements are processed by an inverse FFT (IFFT), summed, and arranged in a covariance matrix. The covariance matrix is then inverted, multiplied by a steering vector, and transformed to the frequency domain by an FFT process, and the transformed result is provided as a weight vector to the first multiplier 126.

The first multiplier 126 performs a portion of the FFT convolution (or weighting or adding) for the first antenna by multiplying the frequency-domain representation or frequency bins of the input signal by transformed weight vectors to reduce or remove interfering signals. The output of the first multiplier 126 is combined with the outputs of a second multiplier 160 and a third multiplier 162 by a beamforming summing circuit 164. The output of the beamforming summing circuit 164 is provided as an input to an Inverse Fast Fourier Transform (IFFT) processor 166, which converts the FFT convolution back to time-domain. The output of the IFFT processor 166 is provided as an input to a Lap and Add circuit 168. Another name for a Lap and Add technique is Overlap and Add. The Lap and Add circuit 168 recombines data that was broken up into smaller pieces for ease of computation. Other techniques, such as select-save techniques, can also be used. The output of the Lap and Add circuit 168 is provided as an input to an interpolation circuit 170. In one embodiment, the interpolation circuit 170 interpolates or oversamples the output of the Lap and Add circuit 168 by a factor of four. It will be understood that other oversampling rates, such as by 2, by 8, and the like can also be used.

Figure 2A:
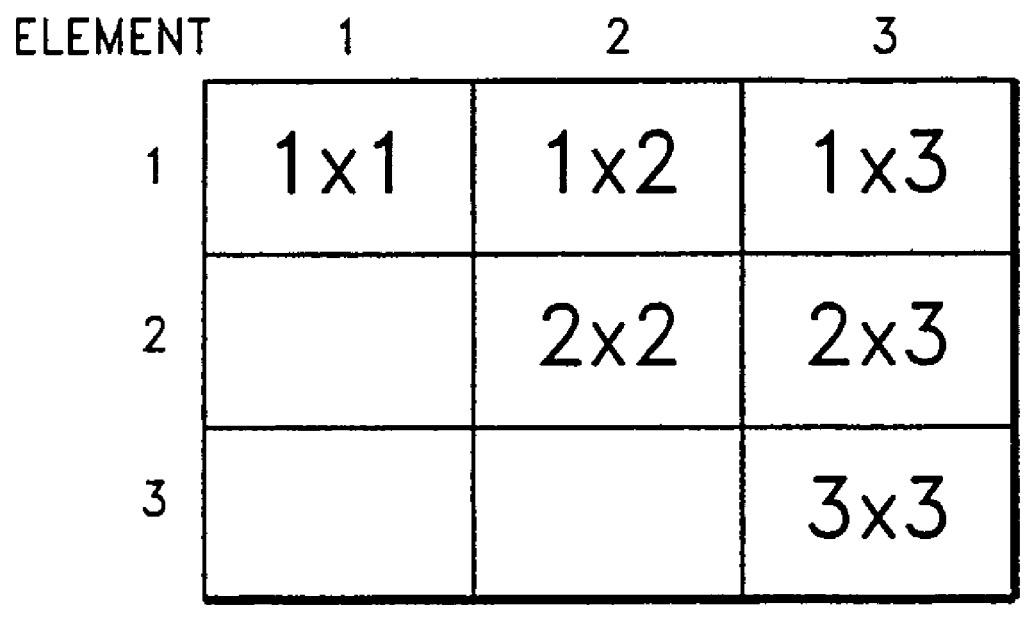

FIG. 2A and FIG. 2B illustrate STAP covariance matrices for a 3-element antenna array and for a 7-element antenna array, respectively. The antenna elements are indicated along the rows and the columns of the matrices. As illustrated in FIGS. 2A and 2B, the size of the covariance matrix and the number of unique sub-matrices within a STAP covariance matrix, depends on the number of elements in the antenna array. A covariance matrix is also known as a variance-covariance matrix. As illustrated in FIG. 2A, a 3×3 covariance matrix for a 3-element antenna array has 6 unique combinations. As illustrated in FIG. 2B, a 7×7 covariance matrix for a 7-element array has 28 unique combinations. These combinations are sub-matrices in themselves. It will be understood that not all of the entries in a covariance matrix are unique because the covariance of A and B is the complex conjugate of the covariance of B and A. Accordingly, a sub-matrix of the covariance at 2×1 is the complex conjugate of the sub-matrix of the covariance at 1×2, and both need not be computed (apart from the computationally simple task of changing the sign of the imaginary part of a number for complex conjugation).

Figure 3:
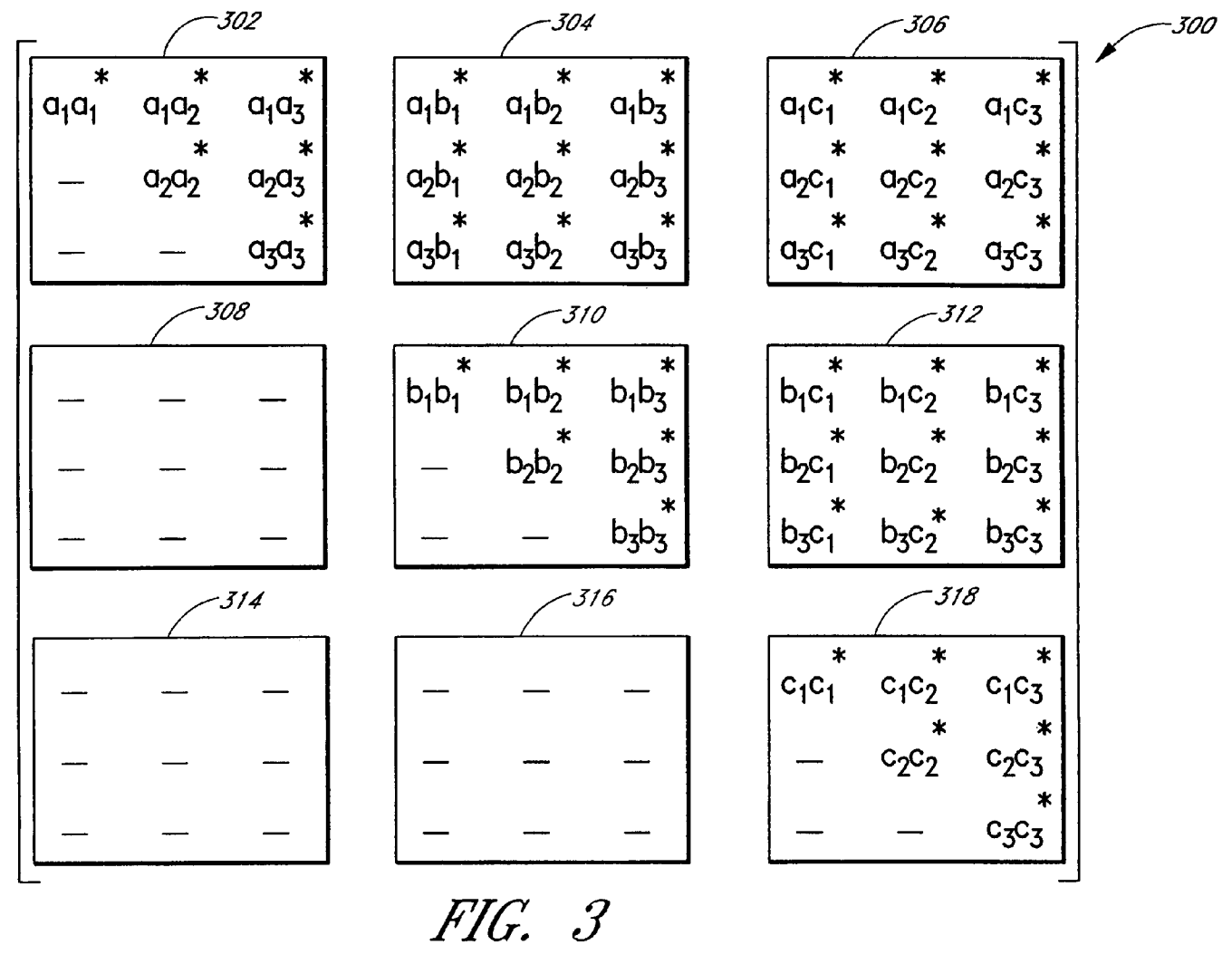
Figure 4A:
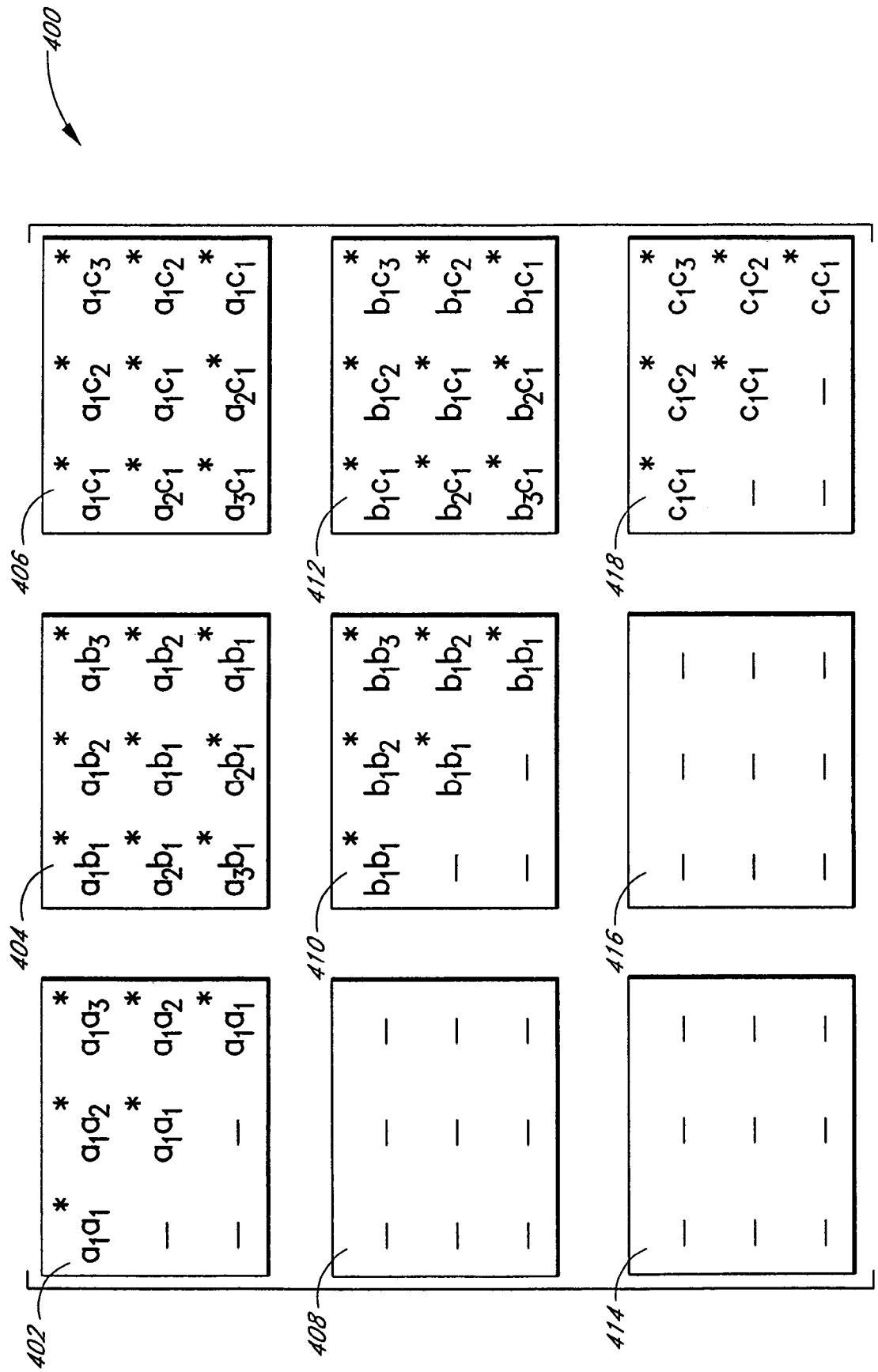
FIGS. 4A and 4B illustrate mapping into a covariance matrix according to one embodiment.
Figure 4B:
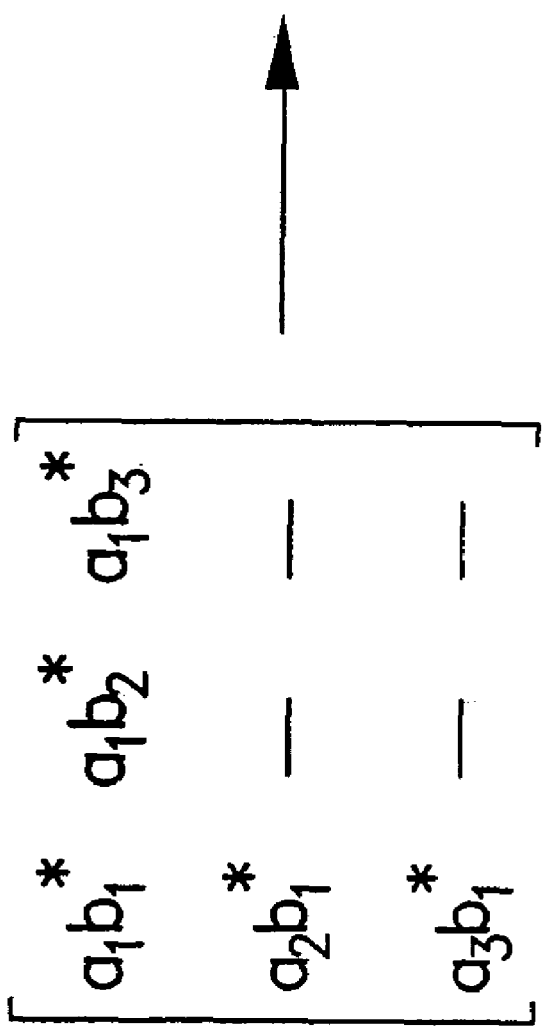
Figure 4B:
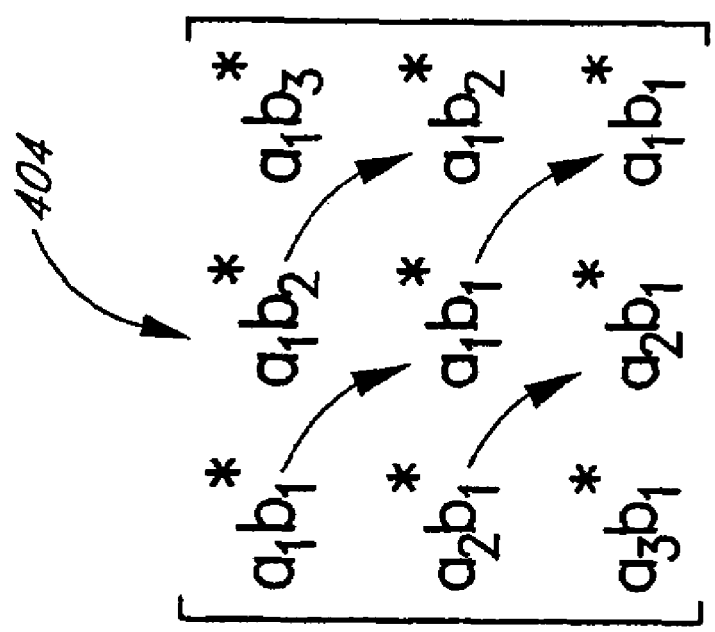

FIG. 3 illustrates a STAP covariance matrix 300 for a 3-element antenna array with conventional calculations for the sub-matrices. It will be understood that the number of antenna elements can vary in a very broad range, and that the 3-element antenna array described in connection with FIGS. 3, 4A, and 4B is one example. The 3-element STAP covariance matrix includes nine sub-matrices. The sub-matrices are indicated by rectangular boxes. Only 6 of the 9 sub-matrices need to be computed, as 3 of the 6 contain redundant information.

Within the sub-matrices, the variables a, b, and c identify the data corresponding to the antenna elements of the 3-element array. The number of antenna elements determines the number of sub-matrices within the covariance matrix. The subscripts 1, 2, and 3 indicate time-domain taps. The number of taps in this example also corresponds to 3, but it will be understood that the number of taps can vary in a very broad range and is usually selected according to available processing power. In another example described later in connection with FIG. 5, five such time-domain taps are used. The number of taps determines the size of a sub-matrix. An asterisk (*) indicates complex conjugation.

Diagonal sub-matrices correspond to the variances of the antenna elements. Non-diagonal sub-matrices correspond to covariance between one antenna element and another. A first sub-matrix 302 corresponds to the variance of a first antenna element (a). A second sub-matrix 304 corresponds to a covariance of the first antenna element (a) with a second antenna element (b). A third sub-matrix 306 corresponds to a covariance of the first antenna element (a) with a third antenna element (c).

A fourth sub-matrix 308 corresponds to the covariance of the first antenna element (a) with the second antenna element (b), which is the complex conjugate of the second sub-matrix 304 and does not need to be computed. A fifth sub-matrix 310 corresponds to the variance of the second antenna element (b). A sixth sub-matrix 312 corresponds to the covariance between the second antenna element (b) and the third antenna element (c).

A seventh sub-matrix 314 corresponds to the covariance between the first antenna element (a) and the third antenna element (c), which is the complex conjugate the third sub-matrix 306 and does not need to be computed. An eighth sub-matrix 316 corresponds to the covariance between the second antenna element (b) and the third antenna element (c), which is the complex conjugate of the sixth sub-matrix 312 and does not need to be computed. A ninth sub-matrix 318 corresponds to the variance of the third antenna element.

As illustrated within the sub-matrices that are calculated, each conventionally calculated sub-matrix in the covariance matrix contains many complex multiplications. It will be appreciated by one of ordinary skill in the art that a multiplication of complex numbers in floating point math can be time consuming and can also occupy a relatively large chip area. For example, to calculate a non-diagonal sub-matrix, the conventionally calculated sub-matrix needs 9 complex multiplications in this 3 tap example. In general, the conventionally calculated non-diagonal sub-matrix performs $n^2$ complex calculations for n number of taps.

The diagonal sub-matrices 302, 310, 318 can be computed with fewer complex multiplications. The diagonal sub-matrices correspond to variance and are Hermitian sub-matrices. Values from below the diagonal of the diagonal sub-matrix need not be computed, but rather, can be copied as complex conjugates from their reflections across the diagonal. For the 3-tap example of FIG. 3, the conventionally calculated diagonal sub-matrix needs 6 complex multiplications.

Redundancy-Induced Reduction in Computational Complexity

FIGS. 4A and 4B illustrate how the number of calculations within the sub-matrices of the covariance matrix can advantageously be reduced in number. The illustrated embodiment of the covariance matrix again corresponds to a 3-element antenna array such that covariance matrix has 9 sub-matrices, 6 of which are unique. The sub-matrices 402, 404, 406, 408, 410, 412, 414, 416, 418 of the covariance matrix of FIG. 4A contain approximately the same data as the sub-matrices 302, 304, 306, 308, 310, 312, 314, 316, 318 of the covariance matrix of FIG. 3, but can be computed in relatively less time by relatively smaller circuitry.

The diagonal sub-matrices, i.e., a first sub-matrix 402, a fifth sub-matrix 410, and a sixth sub-matrix 418 correspond to the variances of the first antenna element (a), the second antenna element (b), and the third antenna element (c), respectively. A second sub-matrix 404, a third sub-matrix 406, and a sixth sub-matrix 412 correspond to covariances between the first antenna element (a) and the second antenna element (b), the first antenna element (a) and the third antenna element (c), and the second antenna element and the third antenna element (c), respectively. Again, a fourth sub-matrix 408, a seventh sub-matrix 414, and an eighth sub-matrix 416 need not be computed as they are the complex conjugates of the second sub-matrix 404, the third sub-matrix 406, and the sixth sub-matrix 412, respectively.

Advantageously, rather than computing all of the terms of the non-diagonal sub-matrices, embodiments copy at least one of the terms of the non-diagonal sub-matrix that is conventionally calculated. One embodiment of the invention computes only one row and one column of each non-diagonal sub-matrix. In the illustrated embodiment of FIG. 4A, the first row and the first column are calculated, and the rest of the values are copied from the first row and the first column. In another embodiment, a different row or a different column can be selected, calculated, and copied. For example, in another embodiment, the last row and the last column can be selected.

It will be understood by one of ordinary skill in the art that in another embodiment, a portion of the data that is copied in the illustrated embodiment can also be calculated and still fall within the scope of the invention, i.e., that a term that can be copied is calculated. In the illustrated embodiment, the terms of the non-diagonal sub-matrix are copied from the calculated first row and the first column by copying from a term that is to the left and above, i.e., displaced in time by a tap or clock cycle.

The terms can be copied because the terms of the sub-matrix correspond to correlations that are integrated over relatively long intervals, such as 2 mS. It will be understood that the integration period can vary over a very broad range and that lossy integration techniques can also be used. However, the displacement between terms corresponds to a single tap. In one embodiment, where the sample rate corresponds to 23.516 MHz, the taps are about 42.5 nS apart, which is insignificant relative to the integration period. Mathematically, the sub-matrices can be considered to be Toeplitz matrices and advantageously processed with more efficient techniques than by conventional techniques.

The effect is that the values in a diagonal line from an upper left to a lower right are approximately the same in these sub-matrices. The process can repeatedly copy the term through the sub-matrix. Copying terms in the sub-matrix is described in greater detail later in connection with FIG. 4B. In the illustrated 3-tap sub-matrix, the non-diagonal sub-matrix can then be calculated with only 5 complex multiplications rather than the 9 multiplications required for the conventional calculations. In general, the non-diagonal sub-matrix according to one embodiment can be calculated with only 2n−1 complex multiplications, where n is the number of taps. The number of complex calculations of one embodiment, 2n−1, can be significantly less than $n^2$ complex multiplications, particularly when the number of taps is relatively large.

The diagonal sub-matrices can be efficiently processed in a similar manner. One embodiment calculates only one row or only one column of the diagonal sub-matrix. For example, in the illustrated embodiment, only the top-most row is calculated, and the remaining values are copied. In an alternative embodiment, another row, such as the bottom-most row, can be selected to be computed. In the illustrated embodiment, data values are again copied from the value that is to the left and above. As described earlier, values below the diagonal of a diagonal sub-matrix can be copied (with appropriate complex conjugation) since these sub-matrices are Hermitian, and as a result, computation of the diagonal sub-matrix can be accomplished with the complex multiplication of only one row or column. For example, for the first sub-matrix 402 of the illustrated embodiment with 3 taps, only 3 complex multiplications are needed as opposed to the 6 complex multiplications needed for the first sub-matrix 302 calculated according to conventional techniques.

FIG. 4B illustrates mapping according to an embodiment. The second sub-matrix 404 of FIG. 4A, which corresponds to the covariance of the first antenna element (a) with the second antenna element (b) is used as an example. In the illustrated embodiment, only the first row with the terms a1b1*, a1b2*, and a1b3* and the first column with the additional terms a2b1* and a3b1* are calculated with complex multiplication. The mapping can efficiently fill in the rest of the second sub-matrix 404. As illustrated by curved arrows, the terms in diagonals from the upper left to the lower right, i.e., for corresponding tap number increments between the antenna elements, are approximately equal and can be copied. As illustrated in FIG. 4B, the a1b1* term is copied twice along the diagonal. It will be understood that in embodiments with more taps, the a1b1* term can be copied more times than shown in FIG. 4B. The a1b2* term and the a2b1* term are also copied. Copying can be performed much more efficiently and with much less circuitry than floating point multiplication, and the mapping technique advantageously saves chip space and processing power.

FIG. 5 illustrates sample data in a covariance matrix. The sample data corresponds to data that was actually calculated, rather than to data that was copied via the mapping techniques described earlier in connection with FIGS. 4A and 4B. The sample data illustrates the validity of copying data via the mapping techniques.

An upper table in FIG. 5 corresponds to the taps of an antenna element correlated with itself, i.e., variance. For example, this sample data corresponds to data that would be found in a diagonal sub-matrix, such as the diagonal sub-matrices 302, 310, 318, 402, 410, 418, except that the data in FIG. 5 corresponds to a five-tap correlator. As shown in the upper table of FIG. 5, the data in diagonals from upper left to lower right is approximately the same. In addition, the data reflected across the diagonal (from the top-most left to the bottom-most right) is also approximately the complex conjugate. This sample data demonstrates the validity of mapping data in diagonal sub-matrices.

A lower table in FIG. 5 corresponds to the taps of one antenna element correlated with another antenna element, i.e., covariance. This sample data corresponds to data that would be found in a non-diagonal sub-matrix, such as, for example, the second sub-matrix 304 of FIG. 3 or the second sub-matrix 404 of FIG. 4. As shown in the lower table of FIG. 5, the data in diagonals from upper left to lower right is approximately the same. This sample data demonstrates the validity of mapping data in non-diagonal sub-matrices.

Figure 6:
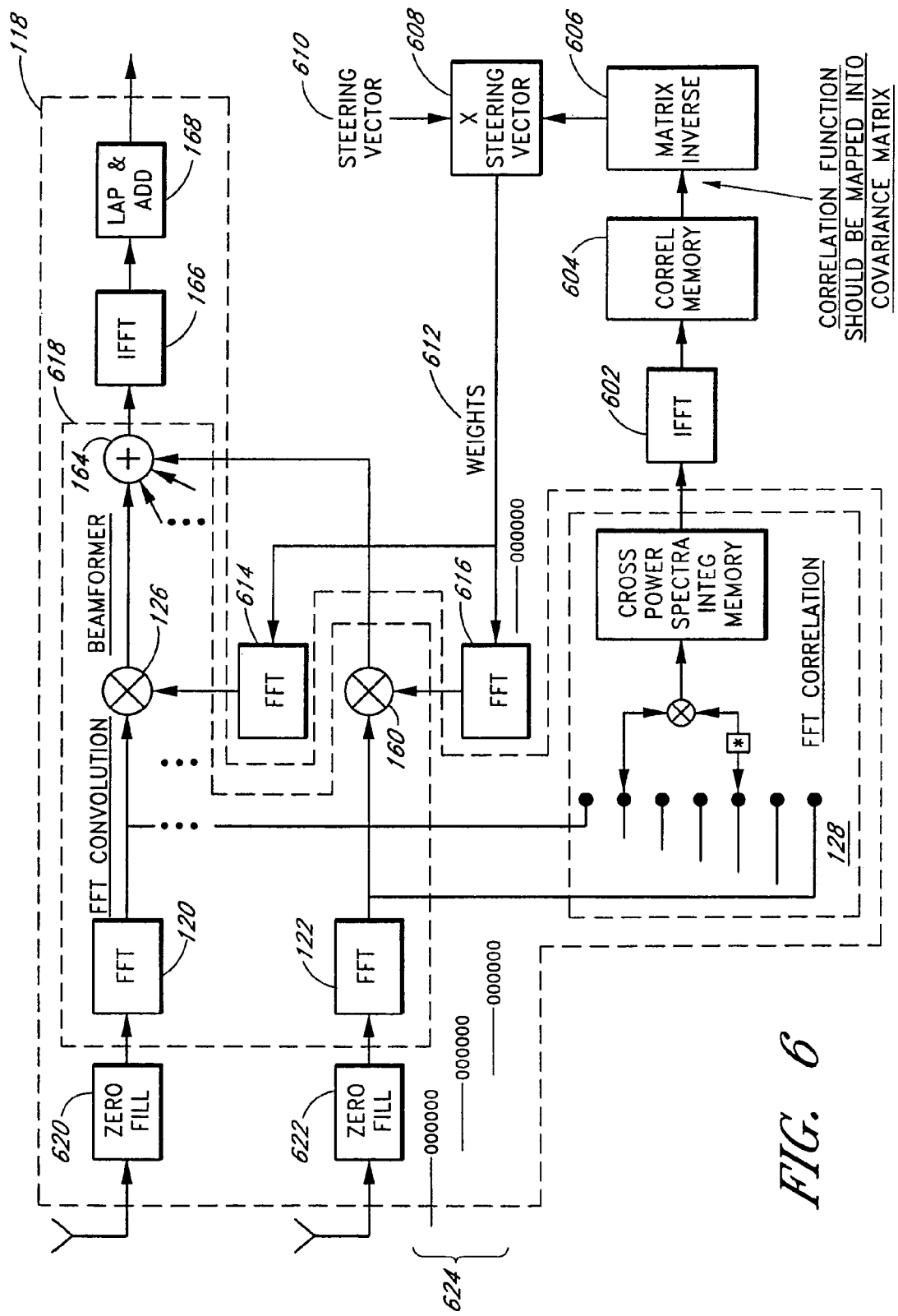
FIG. 6 illustrates one embodiment of a GPS STAP Filter.

FIG. 6 illustrates one embodiment of a GPS STAP Filter. The GPS STAP Filter can be implemented in hardware or in a combination of both hardware and software. A portion of FIG. 6 was described earlier in connection with FIG. 1D. In one embodiment, the upstream portion of the STAP filter 118 is implemented in hardware, such as in an FPGA. Other illustrated components can be implemented in either hardware or in software. It will be understood by one of ordinary skill in the art that in other embodiments, the GPS STAP Filter can be allocated between hardware and software in a broad number of variations.

FIG. 6 also illustrates a first zero fill block 620 and a second zero fill block 622, which provide zero padding to the inputs of the input FFTs. Baseband data from the antenna elements is filled with zeroes such that, for example, there can be 8 values of data, then a fill of 8 zeroes, then another 8 values of data, and so on. The pattern is indicated as a line for the data and zeroes for the zero fill 624. The function of the zero fill can be implemented in a variety of ways, and in one embodiment, the zero fill is incorporated with the input FFTs as described in greater detail later in connection with FIG. 7. In the illustrated embodiment, the zero fill is provided after the data. In other embodiments, the zero fill can be provided before the data, or interspersed within the data. The number of data values between zero fill can vary in a broad range. In FIG. 6, six zeroes are filled at a time. In the example of the FFT with zero fill described in FIG. 8, eight zeroes are filled in at a time.

The illustrated GPS STAP Filter advantageously computes the covariance matrix with FFT Correlation techniques and applies the filtering weights with FFT convolution techniques. As described earlier in connection with FIG. 1D, the FFT Correlation circuit 128 computes FFT correlation for the individual antenna elements. A first Inverse FFT (IFFT) processor 602 computes the Inverse Fourier Transform of the cross-power spectra maintained in the integration memories of the FFT Correlation circuit 128. In one embodiment, a separate IFFT computation is performed for each of the individual outputs of the cross-power spectra available from the FFT Correlation circuit 128.

The number of taps can vary in a very broad range. Where the IFFT is calculated by a general purpose DSP, the available processing power of the DSP can place practical restraints on the number of points of an IFFT that can be computed. In one embodiment, a 64-point IFFT is computed for each of the cross-power spectra channels computed. In another embodiment, where processing power is relatively scarcer, a 16-point IFFT is computed. The first IFFT processor 602 converts the cross-power spectra calculation from frequency domain to time domain. The IFFT can be computed in hardware or in software. For example, the first IFFT processor 602 can be implemented in an FPGA with an existing macro that can be provided by a vendor of the FPGA. In one embodiment, the first IFFT processor 602 is implemented in firmware using a subroutine call from a standardized library.

It will be understood that out of practical considerations, one embodiment of the GPS STAP filter computes the IFFT by processing the data in relatively small pieces, performing the IFFT on the relatively small pieces, and later recombining the pieces. A variety of techniques can be used to recombine the pieces. In one embodiment, a Lap and Add technique is used to recombine the pieces. One embodiment of the Lap and Add technique is described in greater detail later in connection with FIG. 8. In another embodiment, a select-save technique is used to recombine the data.

The data is recombined and stored in a correlation memory 604. The correlation memory 604 maintains the cross correlation and auto correlation functions of the antenna elements. The correlation data is mapped into a covariance matrix as described earlier in connection with FIGS. 2A, 2B, 3, 4A, 4B, and 5. The covariance matrix is inverted by a matrix inversion block 606.

Matrix Inversion Techniques

The matrix inversion block 606 can be implemented in hardware or in software. A variety of techniques can be used to invert the covariance matrix in a GPS STAP Filter. Inverting of the covariance matrix is also known as sample matrix inversion or SMI. Although general matrix inverting techniques can be used, the covariance matrix of an adaptive array or a STAP filter has special matrix properties that can advantageously permit the computation of the inverse of the covariance matrix in a more efficient manner.

Significantly, the covariance matrix of a STAP filter corresponds to a Hermitian matrix. A Hermitian matrix is equal to its conjugate transpose. One embodiment advantageously permits the computation of the inverse of the covariance matrix by performing triangular $UDU^H$ or $LDL^H$ factorization, where H indicates the Hermitian transpose, and backwards or forwards substitution. In one embodiment, the triangular factorization and the backwards or forwards substitution are function calls to subroutines that are provided by a vendor of a DSP chip.

A variety of triangular factorization techniques are applicable. For example, Gauss elimination, Bunch-Kaufman decomposition, and Cholesky decomposition techniques can be used. The covariance matrix is positive definite for relatively large antenna arrays, such as full-size antenna arrays. However, for small miniature antenna arrays, negative eigenvalues can be encountered. One embodiment of the STAP filter uses Bunch-Kaufman methods to implement the triangular factorization. Bunch-Kaufman methods are about twice as fast as Gauss elimination techniques and are compatible with matrices that are positive definite, as well as matrices that are not. In another embodiment, Cholesky decomposition techniques can be used in certain situations. Although Cholesky decomposition techniques are typically faster and more stable than Bunch-Kaufman decomposition techniques, Cholesky decomposition techniques are applicable only to positive definite matrices. In one embodiment, the decomposition method used is selectable or configurable during production or by the end-user. In another embodiment, the sample matrix inversion described above is embodied in firmware code that is executed by a digital signal processor (DSP), such as a DSP selected from the TMS320 family from Texas Instruments, Inc.

In other embodiments, the inverse of the covariance matrix is computed with a conventional technique. In one example, a matrix inversion routine is embodied in firmware code to compute the inverse of the covariance matrix. The firmware code can be executed by a processor, such as a microprocessor, a digital signal processor, or the like. Hardware circuits can also be configured to perform the sample matrix inversion. In addition, a microprocessor core or a DSP core can also be embedded within an application specific integrated circuit (ASIC).

The outputs of the matrix inversion block 606 are provided as inputs to a multiplier block 608. The multiplier block 608 multiplies the inverse of the covariance matrix from the matrix inversion block 606 with a steering vector 610 to generate weights 612. The weights 612 are combined with the input samples to reduce or to reject the interfering signal. Where FFT convolution is not used, the weights can be used as coefficients in a finite-impulse-response (FIR) filter and applied to the input samples. In the illustrated GPS STAP filter of FIG. 6, the weights are applied via FFT convolution techniques.

The weights 612 are provided as inputs to FFT processors configured to transform the weights from the multiplier block 608 from time domain to frequency domain. In the GPS STAP filter shown in FIG. 6, the weights 612 are provided to a first weight FFT processor 614 and to a second weight FFT processor 616. It will be understood that the GPS STAP filter can be scaled to accommodate a broad number of antenna elements and that the number of FFT processors can vary in a broad range. However, the number of FFT processors for weight processing should correspond to the number of antenna elements. In one embodiment, the FFT processors that transform the weights are embodiment in software that is executed by a processor, such as a DSP.

The transformed weights are provided as inputs to the first multiplier 126 and to the second multiplier 160. The first multiplier 126 and the second multiplier 160 apply the weights to the input samples. Advantageously, convolution in the frequency domain, as shown in the GPS STAP filter illustrated in FIG. 6, can be efficiently performed by the relatively simple task of multiplication. It will be recognized by the skilled practitioner that convolution techniques implemented in the time domain can be significantly more complex to implement. For example, convolution in time domain can be implemented via an FIR filter, but at the expense of significantly larger chip area and processing power.

The outputs of the various multipliers that perform the convolution in the frequency domain are provided as inputs to the beamforming summing circuit 164 such that the space-time filtering of the input samples from the individual antenna elements can combined. A dashed block 618 indicates where the FFT convolution and the beamforming occur. The output of the beamforming summing circuit 164 is provided as an input to the IFFT processor 166. The IFFT processor 166 converts the summed convolutions from frequency domain to time domain. It will be understood by one of ordinary skill in the art that the IFFT processor 166 can be implemented in hardware or in software, and can be computed by computationally efficient Inverse Fast Fourier Transform techniques or by other Fourier Transform techniques. One embodiment of the IFFT processor 166 is described in greater detail later in connection with FIG. 8.

The time-domain output of the IFFT processor 166 is provided as an input to the Lap and Add circuit 168. The Lap and Add circuit 168 reassembles the input samples that were processed by breaking the input sample sequence into relatively small parts (relatively short sequences), each of which were individually processed. Other techniques, such as select-save, can also be used to recombine the input sample sequence. One embodiments of the Lap and Add circuit 168 is described later in connection with FIG. 8. The output of the Lap and Add circuit 168 corresponds to the filtered output of the GPS STAP filter, and the output is provided as an input to further baseband processing circuits, such as quadrature demodulation circuits, acquisition circuits, and the like.

Fast Fourier Transform

Figure 7:
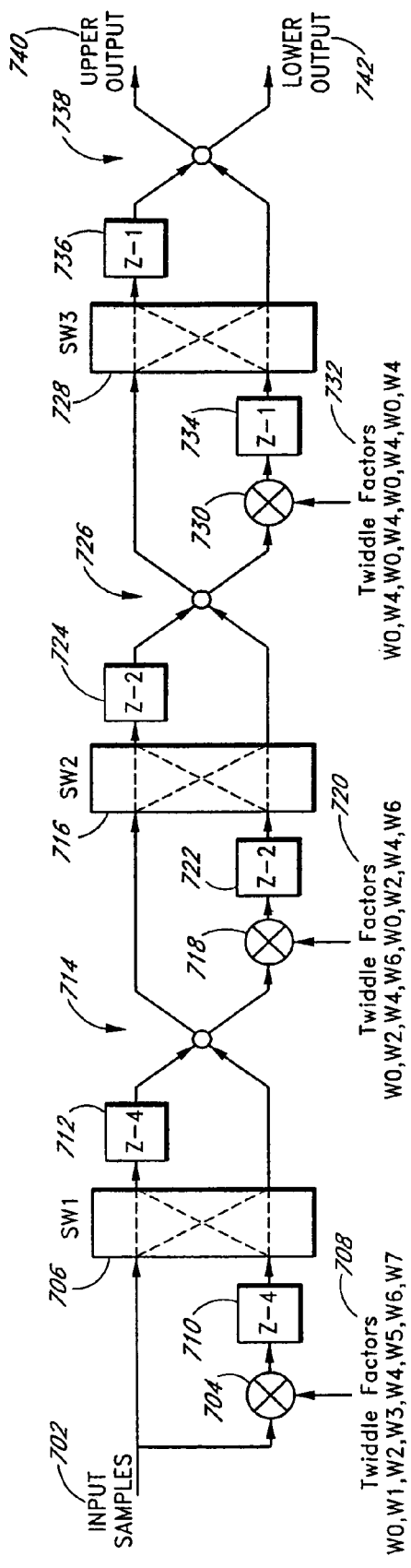
FIG. 7 illustrates one embodiment of a Fast Fourier Transform (FFT) processor.

FIG. 7 illustrates one embodiment of a Fast Fourier Transform (FFT) processor. The illustrated FFT processor can advantageously be used for the input FFTs, such as the first input FFT processor 120 or the second input FFT processor 122 in FIG. 1D and FIG. 6. In one embodiment, the FFT processor can also be used for the weight FFTs, such as the first weight FFT processor 614 or the second weight FFT processor 616. However, the weight FFTs compute data relatively infrequently and can be implemented in software. The pipelined FFT processor illustrated in FIG. 7 advantageously computes the FFT with 100% efficiency, where efficiency is defined as the percentage of time at which butterfly elements in the processor perform computations. By contrast, one conventional pipelined FFT processor is only about 50% efficient, see Lawrence R. Rabiner, et al., *Theory and Application of Digital Signal Processing*, Prentice-Hall 1975, pp. 604–609. In the conventional pipelined FFT processor, half of the input samples are shifted into an upper data path, and the other half are shifted into a lower data path.

In one embodiment of the GPS STAP filter, half of the input samples provided to an FFT processor, such as the first input FFT processor 120, are filled with a value of zero. The value of zero is a constant, and the FFT processor illustrated in FIG. 7 advantageously directly loads this constant and avoids the delay of shifting in a constant.

The FFT processor of FIG. 7 corresponds to a 16-point radix 2 decimation in frequency FFT processor. Although the FFT processor is described in a 16-point FFT processor, it will be understood by one of ordinary skill in the art that the number of points of the FFT processor can be varied in a very broad range, such as, for example, 8 points, 64 points, etc. Input samples 702 are advantageously provided directly as inputs to a first multiplier 704 and to an upper input of a first switch 706. In a conventional FFT processor, the input samples 702 would be provided to a switch, a delay stage, and a butterfly stage prior to application to the first multiplier 704 or to the upper input of the first switch. This direct loading advantageously saves space, saves power, improves efficiency, and also provides the zero filling.

The input samples 702 can correspond to, for example, the time-domain samples of the digital baseband signal that corresponds to an antenna element. The first multiplier 704 performs a complex multiplication of the value of the input sample and a first twiddle factor 708. In one embodiment, the twiddle factors are retrieved from a lookup table. For an N-point FFT, the twiddle factor is expressed in Equation 2.

$$W_n = e^{-j2\pi n/N} \quad \text{(Eq. 2)}$$

In the illustrated FFT processor, the first twiddle factor 708 is applied to the first multiplier 704 in the following repeating order {W0, W1, W2, W3, W4, W5, W6, W7}. The output of the first multiplier 704 is provided as an input to a first delay block 710. The first delay block 710 delays the output of the first multiplier 704 by four clocks periods, where a clock period is a step through the pipelined FFT. The first delay block 710 can be implemented by, for example, cascaded registers in hardware or by retrieving data from memory with an offset in time. The output of the first delay block 710 is provided as an input to a lower input of the first switch 706.

The first switch 706 alternately switches between two states with every fourth clock period. In a first state, the first switch 706 selects the straight connection, such that the input data on the upper input line is coupled to an upper output of the first switch 706, and the input data on the lower input line is coupled to a lower output of the first switch 706. In a second state, the first switch 706 selects the cross connection, such that the input data on the upper input line is couple to the lower output of the first switch 706, and the input data on the lower input line is coupled to the upper output of the first switch 706. The upper output line of the first switch 706 is provided as an input to a second delay block 712. The delay of the second delay block 712 should be matched to the delay of the first delay block 710, i.e., a four clock cycle delay.

The output of the second delay block 712 and the lower output of the first switch 706 are provided as inputs to a first butterfly 714. An upper output of the first butterfly 714 (on the right) provides the sum of the two inputs on the left. A lower output of the first butterfly 714 provides the difference between the two inputs on the left, where the difference is the value of the upper line minus the value of the lower line.

The sum output of the first butterfly 714 is provided as an input to an upper input line of a second switch 716. The difference output of the first butterfly 714 is provided as an input to a second multiplier 718, which multiplies the difference output with a second twiddle factor 720. The second twiddle factor 720 is provided in the following repeating sequence: {W0, W2, W4, W6, W0, W2, W4, W6}. The output of the second multiplier 718 is provided as an input to a third delay block 722. The third delay block 722 delays data in the path by two clock periods. An output of the third delay block 722 is provided as an input to a lower input line of the second switch 716.

The second switch 716 is configured to alternately switch between two states with every other clock period. In the first state, the second switch 716 selects the straight connection. In the second state, the second switch 716 selects the cross connection. An upper output of the second switch 716 is provided as an input to a fourth delay block 724. The delay of the fourth delay block 724 should be matched to the delay of the third delay block 722, i.e., two clock periods.

The output of the third delay block 722 is provided as an input to an upper input line of a second butterfly 726. A lower output of the second switch 716 is provided as an input to a lower input line of the second butterfly 726.

The second butterfly 726 provides a sum of the inputs on an upper output line and a difference of the inputs on a lower output line. The polarity of the lower output line is again the upper input line minus the lower input line. The sum output of the second butterfly 726 is provided as an input to an upper input of a third switch 728. The difference output of the second butterfly 726 is provided as an input to a third multiplier 730.

The third multiplier 730 multiplies the difference output with a third twiddle factor 732. The third twiddle factor 732 is provided in the following repeating sequence: {W0, W4, W0, W4, W0, W4, W0, W4}. The output of the third multiplier 730 is provided as an input to a fifth delay block 734, which delays the output of the third multiplier 730 by one clock cycle and provides the delayed output as an input to a lower input of the third switch 728.

The third switch 728 alternately switches between a first state and a second state with every clock cycle. In the first state, the third switch 728 selects the straight connection. In a second state, the third switch 728 selects the cross connection. The upper output line of the third switch 728 is provided as an input to a sixth delay block 736, which should be matched in delay to the delay of the fifth delay block 734, i.e., one clock cycle.

The output of the sixth delay block 736 is provided as an input to an upper input of a third butterfly 738. A lower output of the third switch 728 is provided as an input to a lower input of the third butterfly 738. The third butterfly 738 provides a sum on an upper output 740 and a difference on a lower output 742. The polarity of the lower output 742 corresponds to the upper input minus the lower input. The upper output 740 and the lower output 742 of the third butterfly 738 correspond to the outputs of the FFT processor. The upper output 740 and the lower output 742 provide outputs in reverse binary order. In one embodiment, the upper output 740 is provided in the following repeating sequence: {$bin_0$, $bin_4$, $bin_2$, $bin_6$, $bin_1$, $bin_5$, $bin_3$, $bin_7$}, and the lower output is provided in the following repeating sequence: {$bin_8$, $bin_{12}$, $bin_{10}$, $bin_{14}$, $bin_9$, $bin_{13}$, $bin_{11}$, $bin_{15}$}. In one embodiment of the GPS STAP filter, the reverse binary order of the upper output 740 and the lower output 742 are maintained in further computations, such as beamforming, to save computations.

Inverse Fast Fourier Transform with Lap and Add

Figure 8:
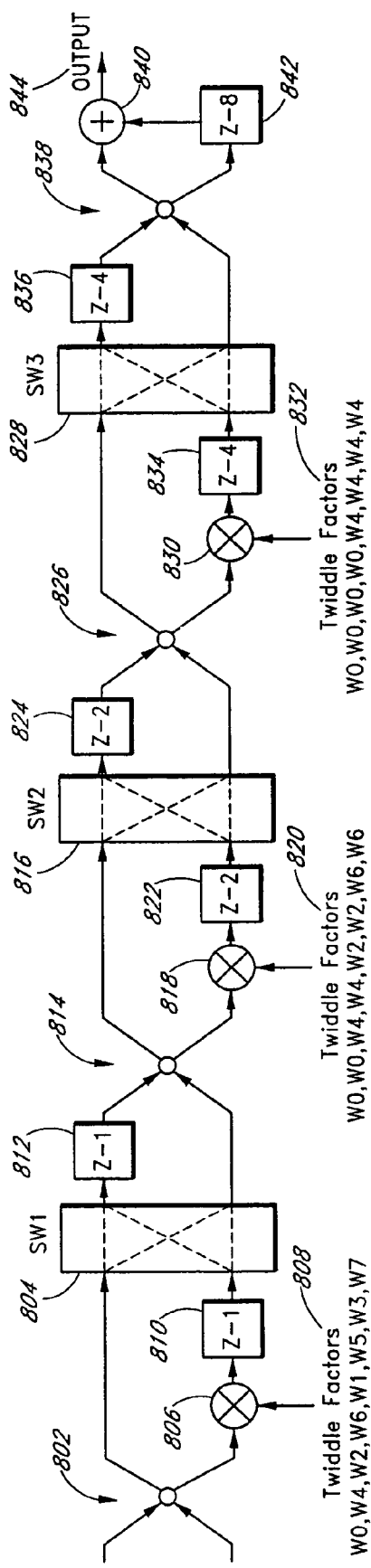
FIG. 8 illustrates one embodiment of an Inverse FFT processor with Lap and Add.

FIG. 8 illustrates one configuration of an Inverse FFT (IFFT) processor with Lap and Add. The pipelined IFFT processor illustrated in FIG. 8 can be used in place of the IFFT processor and the Lap and Add circuit 168 described earlier in connection with FIGS. 1D and 6. Advantageously, the IFFT processor is also 100% efficient. The IFFT processor illustrated in FIG. 8 corresponds to a 16-point Radix-2 Decimation in Time IFFT processor. It will be understood that the data and the operations in the IFFT processor involve complex numbers.

Inputs are applied to the IFFT processor in reverse binary order as described earlier in connection with the reverse binary output of the FFT processor of FIG. 8. Advantageously, the steps of converting to natural order and to reconvert back to reverse binary order are avoided by the illustrated FFT and IFFT processor combination. Further advantageously, the output of the IFFT processor of FIG. 8 is in natural order.

The reverse binary order inputs from, for example, the beamforming summing circuit 164 are provided as inputs to a first butterfly 802. The first butterfly 802 provides the sum of the inputs on an upper output line and a difference of the inputs on a lower output line. The difference corresponds to the upper input line minus the lower input line. The sum output of the first butterfly 802 is provided as an input to an upper input of a first switch 804. The difference output of the first butterfly 802 is provided as an input to a first multiplier 806.

The first switch 804 alternates between a first state and a second state on every clock cycle. In a first state, the first switch 804 selects the straight connection and in a second state, the first switch 804 selects the cross connection. The first multiplier 806 multiplies the data from the difference output with a first twiddle factor 808. The first twiddle factor 808 is applied in the following repeating sequence:{W0, W4, W2, W6, W1, W5, W3, W7}. The output of the first multiplier 806 is delayed for one clock cycle by a first delay block 810, and the delayed output is provided as an input to a lower input of the first switch 804.

The upper output of the first switch is coupled to a second delay block 812. The delay of the second delay block 812 should be matched to the delay of the first delay block 810, i.e., one clock cycle. The output of the first delay block 810 is provided as an input to an upper input of a second butterfly 814. The lower output of the first switch 804 is provided as an input to a lower input of the second butterfly 814. The second butterfly 814 provides a sum on an upper output line and a difference on a lower output line in a like manner to the first butterfly 802.

The sum output of the second butterfly 814 is provided as an input to an upper input line of a second switch 816. The difference output of the second butterfly 814 is provided as an input to a second multiplier 818, which multiplies the difference output with a second twiddle factor 820. The second twiddle factor 820 is applied in the following repeating sequence:{W0, W0, W4, W4, W2, W2, W6, W6}. The output of the second multiplier 818 is delayed by a third delay block 822 for two clock cycles, and the delayed output is provided as an input to a lower input of the second switch 816.

The upper output of the second switch 816 is provided as an input to a fourth delay block 824. The delay of the fourth delay block 824 should be matched to the delay of the third delay block 822, i.e., 2 clock cycles. An output of the fourth delay block 824 is provided as an input to the upper input of a third butterfly 826. A lower output of the second switch 816 is provided as an input to a lower input of the third butterfly 826.

The third butterfly 826 provides a sum on an upper output line and a difference on a lower output line as described earlier in connection with the first butterfly 802. The sum output of the third butterfly 826 is provided as an input to an upper input of a third switch 828. The difference output of the third butterfly 826 is provided as an input to a third multiplier 830, which multiplies the difference output with a third twiddle factor 832. The third twiddle factor 832 is applied in the following repeating sequence:{W0, W0, W0, W0, W4, W4, W4, W4}.

The output of the third multiplier 830 is delayed by four clock cycles by a fifth delay block 834. The delayed output of the fifth delay block 834 is provided as an input to a lower input of the third switch 828. The third switch 828 alternately switches between a first state and a second state with every four clock cycles. In the first state, the third switch 828 selects a straight connection. In the second state, the third switch 828 selects a cross connection. An upper output of the third switch 828 is coupled to a sixth delay block 836. The delay of the sixth delay block 836 is matched to the delay of the fifth delay block 834, i.e., four clock cycles. The output of the sixth delay block 836 is provided as an input to an upper input of a fourth butterfly 838. A lower output of the third switch 828 is provided as an input to a lower input of the fourth butterfly 838.

The fourth butterfly 838 provides a sum on an upper output line and a difference on a lower output line. The polarity of the difference corresponds to the difference between the upper input line and the lower input line. The sum from the fourth butterfly 838 is provided as an input to a summer 840. The summer 840 performs the lap and add by summing the sum output of the upper output of the fourth butterfly 838 with an output of a seventh delay block 842. The seventh delay block 842 delays the difference output of the fourth butterfly 838 by 8 clock cycles. The output of the summer 840 is provided as an output of the IFFT with lap and add. In one embodiment, the output of the summer 840 is provided as an input to additional baseband processing circuits, such as circuits for quadrature demodulation and/or circuits for acquisition.

Phase Compensation Injection

Embodiments can advantageously filter interfering signals from a variety of sources, including jammers. However, a GPS receiver can be exposed to a relatively rapidly changing jamming field. Although embodiments can filter out these jamming fields, the GPS STAP filtering can also induce relatively rapid phase changes to the baseband signal.

The rapidly changing phase can cause a GPS receiver to lose carrier phase lock in a carrier tracking loop. Typically, the carrier phase-locked-loop has a relatively narrow bandwidth because of the low signal strength of a GPS signal due to the relatively great distance between a GPS receiver and a GPS space vehicle. A phase locked loop with narrow bandwidth is typically unable to track rapidly changing phases.

One embodiment calculates the phase changes induced by application of the adaptive weights and accordingly steers the carrier tracking loop with the phase changes induced by the GPS STAP filter such that the carrier tracking loop can maintain phase lock with the GPS signal. This can be performed in a manner analogous to that used by inertial measurement units (IMUs) in high dynamic environments.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of beamforming, which generates a time-domain output from intermediate frequency-domain signals within a beamformer, the method comprising:
    receiving values from frequency bins in reverse binary order, wherein the values represent the intermediate frequency-domain signals, wherein the intermediate frequency-domain signals have been filtered by the beamformer in frequency domain to reduce or remove interfering signals;
    computing at least part of an Inverse Fast Fourier Transform (IFFT) in a radix-2 pipeline from the received values;
    delaying a difference output of an output butterfly to generate a delayed difference output; and
    summing a sum output of the output butterfly with the delayed difference output to provide a natural order output IFFT with Overlap and Add output, thereby generating the time-domain output for beamforming.

2. The method as defined in claim 1, wherein delaying corresponds to 8 clock periods of the pipeline.

3. A pipelined circuit for computing an Inverse Fourier Transform, the pipelined circuit comprising:
    a plurality of butterfly stages, wherein the butterfly stages are configured to compute sum and differences of their inputs, wherein a first butterfly stage is configured to receive an input in reverse binary order;
    a plurality of multipliers coupled to difference outputs of the butterfly stages, wherein the multipliers are configured to multiply the difference outputs with twiddle factors;
    a plurality of first delays circuits coupled to the multipliers;
    a plurality of switches coupled to the sum outputs of the butterfly stages and to the delays, wherein the switches are configured to switch between straight and cross connections;
    a plurality of second delays circuits coupled to outputs of the switches; wherein a second delay circuit is matched in delay to a corresponding first delay circuit;
    a third delay circuit coupled to a difference output of a last of the butterfly stages, wherein the third delay circuit is configured to have twice the delay of the second delay circuit that is coupled to the last of the butterfly stages; and
    a summing circuit coupled to a sum output of the last of the butterfly stages and to an output of the third delay circuit such that the summing circuit overlaps and adds the sum output of the last of the butterfly stages with the output third delay circuit, wherein an output of the summing circuit is an Inverse Fourier Transform in natural order of the inputs.

4. The pipelined circuit as defined in claim 3, wherein the delay of the third delay circuit is 8 clock cycles.

* * * * *